(12) United States Patent
Shavit et al.

(10) Patent No.: US 9,547,524 B2
(45) Date of Patent: Jan. 17, 2017

(54) METHODS AND SYSTEMS FOR ENHANCING HARDWARE TRANSACTIONS USING HARDWARE TRANSACTIONS IN SOFTWARE SLOW-PATH

(71) Applicant: Massachusetts Institute of Technology, Cambridge, MA (US)

(72) Inventors: Nir N. Shavit, Cambridge, MA (US); Alexander Matveev, Tel Aviv-Jaffa (IL)

(73) Assignee: Massachusetts Institute of Technology, Cambridge, MA (US)

( * ) Notice: Subject to any disclaimer, the term of this patent is extended or adjusted under 35 U.S.C. 154(b) by 13 days.

(21) Appl. No.: 14/136,824

(22) Filed: Dec. 20, 2013

(65) Prior Publication Data

US 2014/0181821 A1 Jun. 26, 2014

Related U.S. Application Data

(60) Provisional application No. 61/840,104, filed on Jun. 27, 2013, provisional application No. 61/832,250, filed on Jun. 7, 2013, provisional application No. 61/739,947, filed on Dec. 20, 2012.

(51) Int. Cl.
*G06F 9/46* (2006.01)
*G06F 9/52* (2006.01)

(52) U.S. Cl.
CPC .............. *G06F 9/467* (2013.01); *G06F 9/466* (2013.01); *G06F 9/528* (2013.01)

(58) Field of Classification Search
None
See application file for complete search history.

(56) References Cited

U.S. PATENT DOCUMENTS

| 7,395,382 | B1 * | 7/2008 | Moir ...................... | G06F 9/466 |
| | | | | 711/147 |
| 7,496,726 | B1 * | 2/2009 | Nussbaum et al. ........... | 711/163 |
| 7,516,365 | B2 * | 4/2009 | Lev ............................ | 714/38.13 |
| 8,516,202 | B2 * | 8/2013 | Heller, Jr. ............... | G06F 9/467 |
| | | | | 711/145 |
| 8,539,168 | B2 * | 9/2013 | Dice et al. .................... | 711/152 |
| 8,549,504 | B2 * | 10/2013 | Breternitz, Jr. ..... | G06F 9/30072 |
| | | | | 717/153 |
| 9,361,152 | B2 * | 6/2016 | Calciu ..................... | G06F 9/467 |
| 2007/0055960 | A1 * | 3/2007 | Damron et al. .............. | 717/131 |
| 2007/0239943 | A1 * | 10/2007 | Dice et al. ................... | 711/147 |
| 2008/0256074 | A1 * | 10/2008 | Lev et al. ........................ | 707/8 |
| 2009/0031309 | A1 | 1/2009 | Lev | |
| 2009/0031310 | A1 * | 1/2009 | Lev et al. ..................... | 718/101 |

(Continued)

OTHER PUBLICATIONS

Damron et al.; "Hybrid Transactional Memroy", Oct. 25, 2006, Sun Microsystems Inc., (Damron_2006.pdf; pp. 1-11).*

(Continued)

*Primary Examiner* — Hiren Patel
(74) *Attorney, Agent, or Firm* — Goodwin Procter LLP

(57) ABSTRACT

Hybrid transaction memory systems and accompanying methods. A transaction to be executed is received, and an initial attempt is made to execute the transaction in a hardware path. Upon a failure to successfully execute the transaction in the hardware path, an attempt is made to execute the transaction in a hardware-software path. The hardware-software path includes a software path and at least one hardware transaction.

26 Claims, 30 Drawing Sheets

(56) References Cited

U.S. PATENT DOCUMENTS

| | | | |
|---|---|---|---|
| 2010/0333096 A1* | 12/2010 | Dice et al. | 718/102 |
| 2011/0119452 A1 | 5/2011 | Heller, Jr. | |
| 2011/0125973 A1* | 5/2011 | Lev et al. | 711/153 |
| 2011/0145637 A1 | 6/2011 | Gray et al. | |
| 2012/0079215 A1* | 3/2012 | Gray et al. | 711/146 |
| 2012/0079246 A1* | 3/2012 | Breternitz et al. | 712/208 |

OTHER PUBLICATIONS

Luke Dalessandro et al.; "Hybrid TM Using NOrec STM" University of Rochester and Lehigh University, Jan. 2, 2010; (Dalessandro_2010.pdf; p. 1).*

Luke Dalessandro et al. "Hybrid Norec: A case study in the effeictiveness of best effor hardware transactional memory", ASPLOS'11 Mar. 5-11, 2011 (Dalessandro_2011.pdf; pp. 39-51).*

Avni, Hillel, et al. (2008) "Maintaining Consistent Transactional States Without a Global Clock," In SIROCCO, pp. 131-140.

Dalessandro, Luke, et al. (2010) "Norec: streamlining stm by abolishing ownership records," In *Proceedings of the 15th ACM SIGPLAN Symposium on Principles and Practice of Parallel Programming*, PPoPP '10, pp. 67-78.

Dalessandro, Luke, et al. (2011) "Hybrid norec: a case study in the effectiveness of best effort hardware transactional memory," SIGPLAN Not., 46(3): pp. 39-52.

Damron, Peter, et al. (2006) "Hybrid Transactional Memory," SIGPLAN Not., vol. 41(11): pp. 336-346.

Dice, Dave, et al. (2006) "Transactional locking II," In Proc. of the 20th International Symposium on Distributed Computing (DISC 2006), pp. 194-208.

Dice, Dave, et al. (2009) "TLRW: Return of the read-write lock," In *Transact 2009*, pp. 284-293.

Dragojevic, Aleksandar, et al. (2009) "Stretching Transactional Memory," In PLDI '09, : Proceedings of the 2009 ACM SIGPLAN Conference on Programming Language Design and Implementation, pp. 155-165.

Felber, Pascal, et al. (2008) Dynamic Performance Tuning of Word-Based Software Transactional Memory. In PPoPP '08: Proceedings of the 13th ACM SIGPLAN Symposium on Principles and practice of parallel programming, pp. 237-246.

Kumar, Sanjeev, et al. (2006) "Hybrid transactional memory," In Proceedings of the eleventh ACM SIGPLAN symposium on Principles and practice of parallel programming, PPoPP '06, pp. 209-220.

Lev, Yossi, et al. (2007) "PhTM: Phased Transactional Memory," In Workshop on Transactional Computing (Transact 2007), pp. 1-11.

Riegel, Torvald, et al. (2006) "A Lazy Snapshot Algorithm with Eager Validation," In Proceedings of the 20th International Symposium on Distributed Computing (DISC06), pp. 284-298.

Riegel, Torvald, et al. (2011) "Optimizing Hybrid Transactional Memory: The Importance of Nonspeculative Operations," In Proceedings of the 23rd ACM symposium on Parallelism in algorithms and architectures, SPAA '11, pp. 53-64.

Wang, Amy, et al. (2012) "Evaluation of Blue Gene/Q Hardware Support for Transactional Memories," In Proceedings of the 21st international conference on Parallel architectures and compilation techniques, PACT '12, pp. 127-136.

Intel tsx (2012) "Transactional Synchronization in Haswell," Intel Developer Zone, Article retrieved from website on Sep. 4, 2014: http://software.intel.com/en-us/blogs/2012/02/07/transactional-synchronization-in-haswell, (4 pages).

International Search Report and Written Opinion for International Patent Application No. PCT/US2013/077155 mailed Apr. 11, 2014 (8 pages).

Enrique Vallejo, et al. "Hybrid Transactional Memory to Accelerate Safe Lock-based Transactions," University of Cantabria, (9 pages).

* cited by examiner

HCL Slow-Path transaction (hybrid software mode): main functions.

```
 1: function HCL_SLOWPATH_START(ctx)
 2:     ctx.tx_version ← GVRead(ctx, global_version)
 3: end function
 4:
 5: function HCL_SLOW_PATH_WRITE(ctx, addr, value)
 6:     ctx.write_set ← ctx.write_set ∪ {addr, value}      ▷ add to write-set
 7: end function
 8:
 9: function HCL_SLOWPATH_READ(ctx, addr)
10:     if addr ∈ ctx.write_set then                       ▷ check if the location is in the write-set
11:         return the value from the write-set
12:     end if
13:     ctx.read_set ← ctx.read_set ∪ {addr}               ▷ log the read
14:     s_index ← get_stripe_index(addr)                   ▷ try to read the memory location
15:     ver_before ← stripe_version_array[s_index]
16:     value ← load(addr)
17:     ver_after ← stripe_version_array[s_index]
18:     if ¬ is_locked(ver_before) and ver_before ≤ ctx.tx_version
        and ver_before = ver_after then
19:         return value
20:     else
21:         stm_abort(ctx)
22:     end if
23: end function 24:
25: function HCL_SLOW_PATH_COMMIT(ctx)
26:     if ctx.write_set is empty then                     ▷ read-only transactions commit immediately
27:         return
28:     end if
29:     lock_write_set(ctx)                                ▷ commit locking and visibility
30:     make_visible_read_set(ctx)
31:     new_version ← GVIncrement(ctx, global_version)    ▷ progress the global version
32:     revalidate_read_set(ctx)                           ▷ commit revalidation
33:     while True do                                      ▷ commit validation is successful - now perform the atomic writes
34:         HTM start transaction
35:         write the write-set values to memory (speculative)
36:         HTM commit transaction
37:         if the HTM transaction failed due to contention then
38:             continue                                   ▷ to next iteration - retry HTM transaction
39:         else
40:             fallback to HCL-Slow-Slow-Path hybrid protocol
41:         end if
42:     end while
43:     commit atomic writes are successful - release locks and visibility
44:     release_locks(addr, new_version)
45:     reset_visible_read_set(ctx)
46: end function
```

FIG. 2

HCL Slow-Path transaction: locking and visibility.

```
1:   function IS_LOCKED(stripe_version)
2:       return (stripe_version & 1) = 1   ▷ checks if the low order bit is 1
3:   end function
4:
5:   function IS_LOCKED_BY_ME (ctx, stripe_version)
6:       lock_mask ← (ctx.thread_id * 2) + 1
7:       return version = lock_mask
8:   end function
9:
10:  function LOCK_WRITE_SET(ctx)
11:      lock_mask ← (ctx.thread_id * 2) + 1
12:      for addr ∈ ctx.write_set do
13:          s_index ← get_stripe_index(addr)
14:          s_arr ← stripe_version_array
15:          version ← s_arr[s_index]
16:          if version = lock_mask then
17:              continue   ▷ to next iteration - already locked
18:          end if
                    ▷ CAS(variable, expected_value, new_value), returns
             the expected_value on success, else returns the current variable value.
19:          if version = CAS(s_arr[s_index], version, lock_mask)
             then
20:              return True   ▷ locking is successful
21:          else
22:              stm_abort(ctx)
23:          end if
24:      end for
25:  end function
26:
27:  function MAKE_VISIBLE_READ_SET(ctx)
28:      for addr ∈ ctx.read_set do
29:          s_index ← get_stripe_index(addr)
30:          mask_arr ← stripe_read_mask_array
31:          id ← ctx.thread_id
32:          if (mask_arr[s_index] & 2^id) = 0 then
                    ▷ turn ON the id-th bit of the read mask
                        ▷ fetch_and_add(variable, value_to_add), atomic addition
             of value_to_add.
33:              fetch_and_add(mask_arr[s_index], 2^id)
34:          end if
35:      end for
36:  end function
37:
38:  function RESET_VISIBLE_READ_SET(ctx)
39:      for addr ∈ ctx.read_set do
```

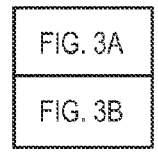

```
40:         s_index ← get_stripe_index(addr)
41:         mask_arr ← stripe_read_mask_array
42:         id ← ctx.thread_id
43:         if (mask_arr[s_index] & 2^{id}) ≠ 0 then
                ▷ turn OFF the id-th bit of the read mask
                    ▷ fetch_and_add(variable, value_to_add), atomic addition of
        value_to_add.
44:             fetch_and_add(mask_arr[s_index], (-2^{id}))
45:         end if
46:     end for
47: end function
48:
49: function REVALIDATE_READ_SET(ctx)
50:     for addr ∈ ctx.read_set do
51:         s_index ← get_stripe_index(addr)
52:         version ← stripe_version_array[s_index]
53:         if is_locked_by_me(ctx, version) then
54:             continue   ▷ to next iteration - the location is locked
        by the thread
55:         end if
56:         if version > ctx.tx_version then
57:             stm_abort(ctx)
58:         end if
59:     end for
60: end function
61:
62: function RELEASE_LOCKS(addr, new_version)
63:     for addr ∈ ctx.write_set do
64:         s_index ← get_stripe_index(addr)
65:         s_arr ← stripe_version_array
66:         s_arr[s_index] ← new_version
67:     end for
68: end function
```

FIG. 3B

HCL Fast-Path transaction (hybrid hardware mode): main functions.

```
1:  function HCL_FASTPATH_START(ctx)
2:      HTM_Start()
3:  end function
4:
5:  function HCL_FASTPATH_WRITE(ctx, addr, value)
6:      ctx.write_set ← ctx.write_set ∪ {addr}           ▷ log the write
7:      store(addr, value)                                ▷ write value to memory
8:  end function
9:
10: function HCL_FASTPATH_READ(ctx, addr)
        ▷ no instrumentation - simply read the location
11:     return load(addr)
12: end function
13:
14: function HCL_FASTPATH_COMMIT(ctx)
        ▷ read-only transactions commit immediately
15:     if ctx.write_set is empty then
16:         HTM_Commit()
17:     end if
        ▷ verify the write-set locations are not read by concurrent
        software transactions
18:     total_mask ← 0
19:     for addr ∈ ctx.write_set do
20:         s_index ← get_stripe_index(addr)
21:         mask_arr ← stripe_read_mask_array
22:         total_mask ← total_mask || mask_arr[s_index]     ▷ || - bitwise OR operation
23:     end for
24:     if total_mask ≠ 0 then
25:         HTM_Abort()       ▷ there is a concurrent software reader
26:     end if
        ▷ put locks on the write-set locations
27:     lock_mask ← (ctx.thread_id * 2) + 1
28:     for addr ∈ ctx.write_set do
29:         s_index ← get_stripe_index(addr)
30:         s_arr ← stripe_version_array
31:         s_arr[s_index] ← lock_mask
32:     end for
33:     HTM_Commit()
34:     if HTM commit successful then
            ▷ now the write-set locations are updated and locked -
            it is safe to progress the global version and unlock the write-set locations
            by updating their versions to the new one.
35:         new_version ← GVIncrement(ctx, global_version)
36:         for addr ∈ ctx.write_set do
37:             s_index ← get_stripe_index(addr)
38:             s_arr ← stripe_version_array
39:             s_arr[s_index] ← new_version
40:         end for
41:         return
42:     end if
43: end function
```

FIG. 4

HCL Slow-Path transaction with slow-slow-path fallback implementation.

```
1: function HCL_SLOWPATH_COMMIT(ctx)
2:     if ctx.write_set is empty then              ▷ read-only transactions commit immediately
3:         return
4:     end if
5:     lock_write_set(ctx)                          ▷ commit locking and visibility
6:     make_visible_read_set(ctx)
7:     new_version ← GVIncrement(ctx.global_version)  ▷ progress the global version
8:     revalidate_read_set(ctx)                     ▷ commit revalidation
                                                    ▷ commit validation is successful - now perform the
   atomic writes
9:     while True do
10:        HTM start transaction
11:        write the write-set values to memory (speculative)
12:        HTM commit transaction
13:        if the HTM transaction failed due to contention then
14:            continue                             ▷ to next iteration - retry HTM transaction
15:        else
16:            fetch_and_add(is_slow_slow)          ▷ atomic +1
17:            write-back the write-set using regular store instructions.
18:            fetch_and_dec(is_slow_slow)          ▷ atomic -1
19:        end if
20:     end while                                   ▷ commit atomic writes are successful - release locks and visibility
21:     release_locks(addr, new_version)
22:     reset_visible_read_set(ctx)
23: end function
```

FIG. 5

HCL hardware mode with HCL- Fast-Path new start function and HCL Slow-Slow-Path implementation

```
 1: function HCL_START(ctx)
 2:     if is_slow_slow > 0 then
 3:         HCL_SlowSlow_Start(ctx)
 4:     else
 5:         HCL_FastPath_Start(ctx)
 6:     end if
 7: end function
 8: function HCL_FASTPATH_START(ctx)
 9:     HTM_Start()
        ▷ Fast-Path monitors the is_slow_slow global counter to be
        0 for the duration of the hardware transaction
10:     if is_slow_slow > 0 then    ▷ speculative load of the global value
11:         HTM_Abort(ctx)
12:     end if
13: end function
14: function HCL_SLOWSLOW_START(ctx)
15:     ctx.tx_version ← GVRead(ctx, globalversion)
16:     HTM_Start()
17: end function
18: 
19: function HCL_SLOWSLOW_WRITE(ctx, addr, value)
        ▷ log the write
20:     ctx.write_set ← ctx.write_set ∪ {addr}
        ▷ write value to memory
21:     store(addr, value)
22: end function
23: 
24: function HCL_SLOWSLOW_READ(ctx,addr)
        ▷ try to read the memory location
25:     s_index ← get_stripe_index(addr)
26:     version ← stripe_version_array[s_index]
27:     value ← load(addr)
28:     if ¬is_locked(version) and version ≤ ctx.tx_version then
29:         return value
30:     else
31:         HTM_abort(ctx)
32:     end if
33: end function
34: 
35: function HCL_SLOWSLOW_COMMIT(ctx)
        ▷ read-only transactions commit immediately
36:     if ctx.write_set is empty then
37:         HTM_Commit()
38:     end if
        ▷ put locks on the write-set locations.
39:     lock_mask ← (ctx.thread_id * 2) + 1
40:     for addr ∈ ctx.write_set do
41:         s_index ← get_stripe_index(addr)
42:         s_arr ← stripe_version_array
43:         s_arr[s_index] = lock_mask
44:     end for
45:     HTM_Commit()
46:     if HTM commit successful then
        ▷ now the write-set locations are updated and locked -
        it is safe to progress the global version and unlock the write-set
        locations by updating their versions to the new one.
47:         new_version ← GVIncrement(ctx, global_version)
48:         for addr ∈ ctx.write_set do
49:             s_index ← get_stripe_index(addr)
50:             s_arr ← stripe_version_array
51:             s_arr[s_index] = new_version
52:         end for
53:         return
54:     end if
55: end function
```

FIG. 6

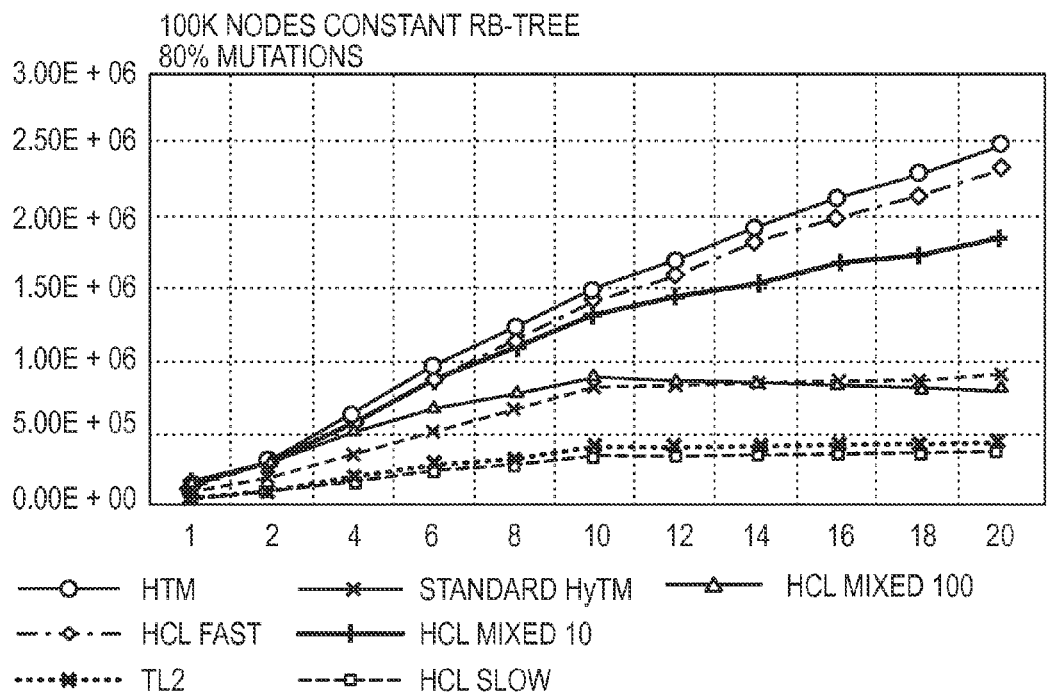
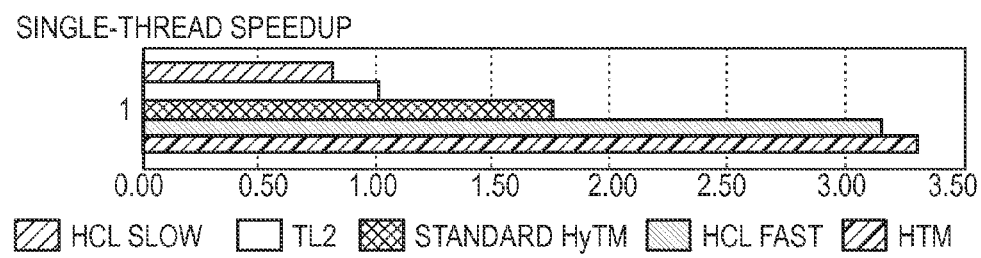
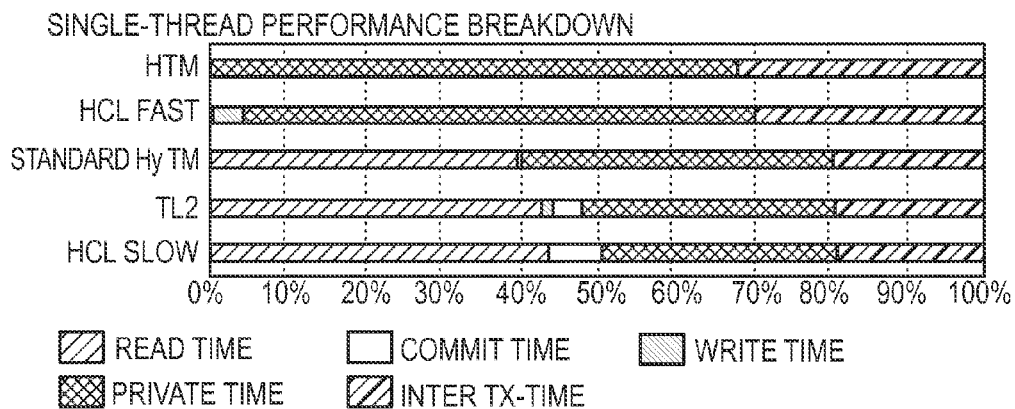
FIG. 8B

RH1 fast-path transaction implementation

1: function RH1_FASTPATH_START(ctx)
2:   HTM_Start()
3:   ctx.next_ver ← GVNext()
4: end function
5:
6: function RH1_FASTPATH_WRITE(ctx, addr, value)
7:   s_index ← get_stripe_index(addr)    ▷ update write location version
8:   stripe_version_array[s_index] ← ctx.next_ver
9:   store(addr, value)                  ▷ write value to memory
10: end function
11:
12: function RH1_FASTPATH_READ(ctx, addr)
       ▷ no instrumentation - simply read the location
13:   return load(addr)
14: end function
15:
16: function RH1_FASTPATH_COMMIT(ctx)
17:   HTM_Commit()
18: end function

FIG. 12

RH1 slow-path transaction implementation

```
 1: function RH1_SLOWPATH_START(ctx)
 2:     ctx.tx_version ← GVRead()
 3: end function
 4:
 5: function RH1_SLOWPATH_WRITE(ctx, addr, value)
                                                    ▷ add to write-set
 6:     ctx.write_set ← ctx.write_set ∪ {addr, value}
 7: end function
 8:
 9: function RH1_SLOWPATH_READ(ctx, addr)
                                                    ▷ check if the location is in the write-set
10:     if addr ∈ ctx.write_set then
11:         return the value from the write-set
12:     end if
                                                    ▷ log the read
13:     ctx.read_set ← ctx.read_set ∪ {addr}
                                                    ▷ try to read the memory location
14:     s_index ← get_stripe_index(addr)
15:     ver_before ← stripe_version_array[s_index]
16:     value ← load(addr)
17:     ver_after ← stripe_version_array[s_index]
18:     if ver_before = ver_after then
                    ver_after ≤ ctx.tx_version and
19:         return value
20:     else
21:         stm_abort(ctx)
22:     end if
23: end function
24:
25: function RH1_SLOWPATH_COMMIT(ctx)
                                                    ▷ read-only transactions commit immediately
26:     if ctx.write_set is empty then
27:         return
28:     end if
                                                    ▷ a single hardware transaction that performs read-set
                                                      revalidation and write-back
29:     HTM_Start()
                                                    ▷ read-set revalidation
30:     for addr ∈ ctx.read_set do
31:         s_index ← get_stripe_index(addr)
32:         version ← stripe_version_array[s_index]
33:         if version > ctx.tx_version then
34:             HTM_Abort(ctx)
35:         end if
36:     end for
                                                    ▷ perform the actual writes and update the locations'
                                                      versions
37:     next_ver ← GVNext()
38:     for addr, new_value ∈ ctx.write_set do
39:         s_index ← get_stripe_index(addr)
40:         stripe_version_array[s_index] ← next_ver
41:         store(addr, new_value)
42:     end for
43:     HTM_Commit()
44:     if the HTM failed then
45:         fallback to RH2
46:     end if
47: end function
```

FIG. 13

| RH1 fast-path and slow-path modifications for switching to RH2 |
| --- |

```
 1: function RH1_FASTPATH_START(ctx)
 2:     if is_RH2_fallback > 0 then
 3:         RH2_FastPath_start(ctx)
 4:         return
 5:     end if
 6:     HTM_Start()
            ▷ RH1 fast-path monitors the is_RH2_fallback global
          counter to be 0 for the duration of the hardware transaction
 7:     if is_RH2_fallback > 0 then   ▷ speculative load of the
          global value
 8:         HTM_Abort()
 9:     end if
10: end function 11:
12: function RH1_SLOWPATH_COMMIT(ctx)
            ▷ read-only transactions commit immediately
13:     if ctx.write_set is empty then
14:         return
15:     end if
            ▷ a single hardware transaction that performs read-set
          revalidation and write-back
16:     HTM_Start()       ▷ read-set revalidation
17:     for addr ∈ ctx.read_set do
18:         s_index ← get_stripe_index(addr)
19:         version ← stripe_version_array[s_index]
20:         if version > ctx.tx_version then
21:             HTM_Abort(ctx)
22:         end if
23:     end for
            ▷ perform the actual writes and update the locations'
          versions
24:     next_ver ← GVNext()
25:     for addr, new_value ∈ ctx.write_set do
26:         s_index ← get_stripe_index(addr)
27:         stripe_version_array[s_index] ← next_ver
28:         store(addr, new_value)
29:     end for
30:     HTM_Commit()
31:     if the HTM failed then
32:         fetch_and_add(is_RH2_fallback)
33:         RH2_SlowPath_commit(ctx)
34:         fetch_and_dec(is_RH2_fallback)
35:     end if
36: end function
```

FIG. 14

```
RH2 fast-path transaction implementation
 1: function RH2_FASTPATH_START(ctx)
 2:    if is_all_software_slow_path > 0 then
 3:       RH2_FastPath_SR_start(ctx)
 4:       return
 5:    end if
 6:    HTM_Start()
       ▷ Fast-Path monitors the is_all_software_slow_path
       global counter to be 0 for the duration of the hardware transaction
 7:    if is_all_software_slow_path > 0 then  ▷ speculative
          load of the global value
 8:       HTM_Abort(ctx)
 9:    end if
10: end function:
11:
12: function RH2_FASTPATH_WRITE(ctx, addr, value)
13:    ctx.write_set ← ctx.write_set ∪ {addr}
          ▷ log the write
14:    store (addr, value)
          ▷ write value to memory
15: end function
16:
17: function RH2_FASTPATH_READ (ctx, addr)
          ▷ no instrumentation - simply read the location
18:    return load (addr)
19: end function
20:
21: function RH2_FASTPATH_COMMIT(ctx)
22:    if ctx.write_set is empty then
          ▷ read-only transactions commit immediately
23:       return
24:    end if
          ▷ verify the write-set locations are not set by concurrent
       software transactions
25:    total_mask ← 0
26:    for addr ∈ ctx.write_set do
27:       s_index ← get_stripe_index(addr)
28:       mask_arr ← stripe_read_mask_array
             ▷ || - bitwise OR operation
29:       total_mask ← total_mask || mask_arr[index]
30:    end for
31:    if total_mask ≠ 0 then
32:       HTM_Abort()  ▷ there is a concurrent software reader
33:    end if
          ▷ put locks on the write-set locations.
34:    lock_mask ← (ctx.thread_id * 2)+1
35:    for addr ∈ ctx.write_set do
36:       s_index ← get_stripe_index(addr)
37:       cur_ver ← stripe_version_array[s_index]
38:       if is_locked_by_me(ctx, cur_ver) then
39:          continue
40:       end if
41:       if is_locked (cur_ver) then
42:          HTM_Abort()
43:       end if
44:       stripe_version_array[s_index] ← lock_mask
45:    end for
46:    HTM_Commit()
47:    if HTM commit successful then
          ▷ now the write-set locations are updated and locked -
          unlock the write-set locations by updating their versions to
          the next one
48:       next_version ← GVNext()
49:       for addr ∈ ctx.write_set do
50:          s_index ← get_stripe_index(addr)
51:          stripe_version_array[s_index] ← next_version
52:       end for
53:       return
54:    end if
55: end function
```

FIG. 15

RH2 slow-path transaction implementation

```
 1: function RH2_SLOWPATH_START(ctx)
 2:     ctx.tx_version ← GVRead ()
 3: end function
 4:
 5: function RH2_SLOWPATH_WRITE(ctx, addr, value)
 6:     ctx.write_set ← ctx.write_set ∪ {addr, value}        ▷ add to write-set
 7: end function
 8:
 9: function RH2_SLOWPATH_READ(ctx, addr)
10:     if addr ∈ ctx.write_set then                          ▷ check if the location is in the write-set
11:         return the value from the write-set
12:     end if
13:     ctx.read_set ← ctx.read_set ∪ {addr}                  ▷ log the read
                                                              ▷ try to read the memory location
14:     s_index ← get_stripe_index(addr)
15:     ver_before ← stripe_version_array[s_index]
16:     value ← load (addr)
17:     ver_after ← stripe_version_array[s_index]
18:     if ver_before = ver_after then   ≤ ctx.tx_version and
19:         return value
20:     else
21:         stm_abort (ctx)
22:     end if
23: end function
24:
25: function RH2_SLOWPATH_COMMIT(ctx)
26:     if ctx.write_set is empty then                        ▷ read-only transactions commit immediately
27:         return
28:     end if
29:     lock_write_set(ctx)                                   ▷ set locking and visibility
30:     make_visible_read_set(ctx)
31:     revalidate_read_set (ctx)                             ▷ commit validation
                                                              ▷ perform the writes atomically
32:     while True do
33:         HTM_Start()
34:         write the write-set values to memory
35:         HTM_Commit()
36:         if the HTM transaction failed due to contention then
37:             continue                                      ▷ retry HTM transaction
38:         else
39:             fetch_and_add(is_all_software_slow_path)
40:             write-back the write-set using regular store instructions.
41:             fetch_and_dec(is_all_software_slow_path)
42:         end if
43:     end while
44:     next_version ← GVNext()                               ▷ reset locking and visibility
45:     release_locks(addr, next_version)
46:     reset_visible_read_set(ctx)
47: end function
```

FIG. 16

RH2 fast-path-slow-read transaction implementation

```
 1: function RH2_FASTPATH_SR_START(ctx)
 2:     ctx.tx_version ← GVRead(ctx.global_version)
 3:     HTM_Start()
 4: end function
 5:
 6: function RH2_FASTPATH_SR_WRITE(ctx, addr, value)
 7:         ▷ log the write
 8:     ctx.write_set ← ctx.write_set ∪ {addr}
 9:         ▷ write value to memory
10:     store(addr, value)
11: end function
12:
13: function RH2_FASTPATH_SR_READ(ctx, addr)
14:         ▷ try to read the memory location
15:     s_index ← get_stripe_index(addr)
16:     version ← stripe_version_array[s_index]
17:     value ← load(addr)
18:     if ¬ is_locked(version) and version ≤ ctx.tx_version
   then
19:         return value
20:     else
21:         HTM_Abort(ctx)
22:     end if
23: end function
24:
25: function RH2_FASTPATH_SR_COMMIT(ctx)
26:         ▷ read-only transactions commit immediately
27:     if ctx.write_set is empty then
28:         HTM_Commit()
29:     end if
30:         ▷ put locks on the write-set locations.
31:     lock_mask ← (ctx.thread_id * 2)+1
32:     for addr ∈ ctx.write_set do
33:         s_index ← get_stripe_index(addr)
34:         cur_ver ← stripe_version_array[s_index]
35:         if is_locked_by_me(ctx, cur_ver) then
36:             continue
37:         end if
38:         if is_locked(cur_ver) then
39:             HTM_Abort()
40:         end if
41:         stripe_version_array[s_index] ← lock_mask
42:     end for
43:     HTM_Commit()
44:     if HTM commit successful then
45:         ▷ now the write-set locations are updated and locked-
   unlock the write-set locations by updating their versions to
   the new one.
46:         next_version ← GVNext()
47:         for addr ∈ ctx.write_set do
48:             s_index ← get_stripe_index(addr)
49:             stripe_version_array[s_index] = next_version
50:         end for
51:         return
52:     end if
53: end function
```

FIG. 17

RH2 slow-path transactions: additional functions

```
 1: function IS_LOCKED (stripe_version)
 2:        return (stripe_version & 1) = 1      ▷ checks if the low order
    bit is 1
 3: end function
 4:
 5: function IS_LOCKED_BY_ME (ctx,stripe_version)
 6:        lock_mask ← (ctx.thread_id * 2) + 1
 7:        return version = lock_mask
 8: end function
 9:
10: function LOCK_WRITE_SET(ctx)
11:        lock_mask ← (ctx.thread_id * 2) + 1
12:        for addr ∈ ctx.write_set do
13:               s_index ← get_stripe_index(addr)
14:               ver ← stripe_version_array[s_index]
15:               if is_locked_by_me(ctx, ver) then
16:                      continue            ▷ to next - already locked
17:               end if
18:               if is_locked (ver) then
19:                      stm_abort(ctx)      ▷ someone else locked
20:               end if
21:               if ver ≠ CAS (stripe_version_array[s_index], ver, lock_mask)
    then
22:                      stm_abort(ctx)      ▷ someone else locked
23:               end if
24:        end for
25: end function
26:
27: function REVALIDATE_READ_SET(ctx)
28:        for addr ∈ ctx.read_set do
29:               s_index ← get_stripe_index(addr)
30:               version ← stripe_version_array[s_index]
31:               if is_locked_by_me(ctx, version) then
32:                      continue
33:               end if
34:               if is_locked(ctx, version) then
35:                      stm_abort(ctx)
```

FIG. 18A

| FIG. 18A |
| FIG. 18B |

FIG. 18

RH2 slow-path transactions: additional functions

```
36:             end if
37:             if version > ctx.tx_version then
38:                 stm_abort(ctx)
39:             end if
40:         end for
41:     end function
42:
43:     function RELEASE_LOCKS (addr, new_version)
44:         for addr ∈ ctx.write_set do
45:             s_index ← get_stripe_index(addr)
46:             stripe_version_array[s_index] ← new version
47:         end for
48:     end function
49:
50:     function MAKE_VISIBLE_READ_SET(ctx)
51:         for addr ∈ ctx.read_set do
52:             s_index ← get_stripe_index(addr)
53:             mask_arr ← stripe_read_mask_array
54:             id ← ctx.thread_id
55:             if (mask_arr[s_index] & $2^{id}$) = 0 then
                    ▷ turn ON the id-th bit of the read mask
56:                 fetch_and_add(mask_arr [s_index], $2^{id}$)
57:             end if
58:         end for
59:     end function
60:
61:     function RESET_VISIBLE_READ_SET(ctx)
62:         for addr ∈ ctx.read_set do
63:             s_index ← get_stripe_index
64:             mask_arr ← stripe_read_mask_array(addr)
65:             id ← ctx.thread_id
66:             if (mask_arr[s_index] & $2^{id}$) ≠ 0 then
                    ▷ turn OFF the id-th bit of the read mask
67:                 fetch_and_add(mask_arr[s_index], ($-2^{id}$))
68:             end if
69:         end for
70:     end function
```

FIG. 18B

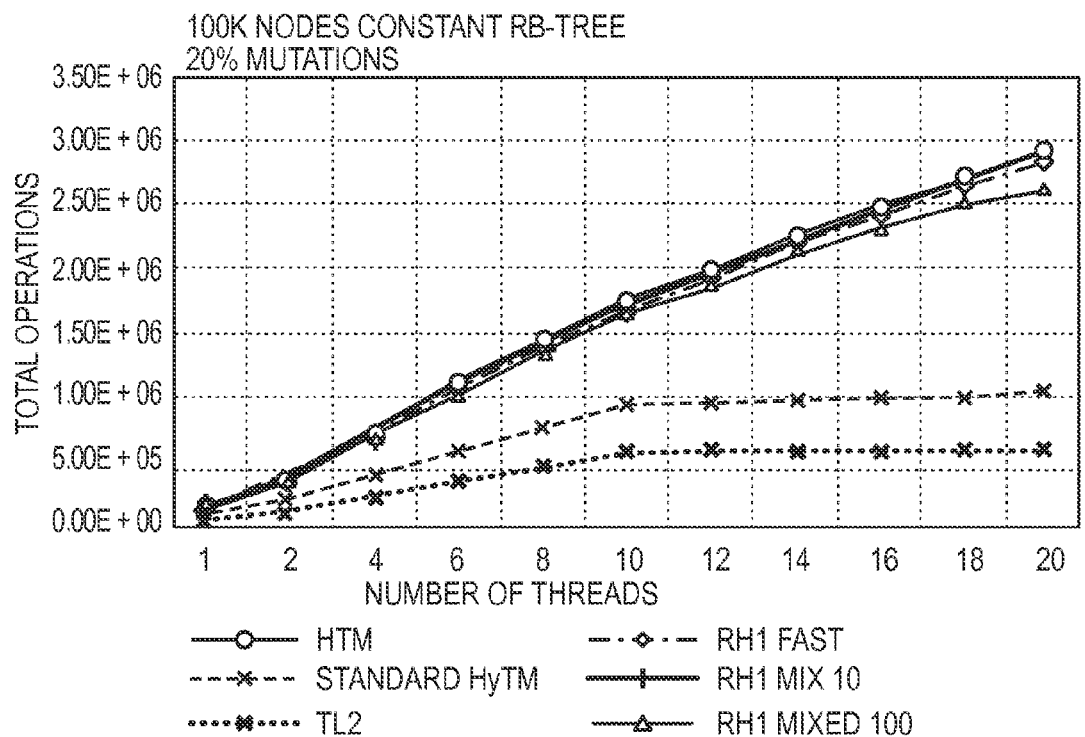
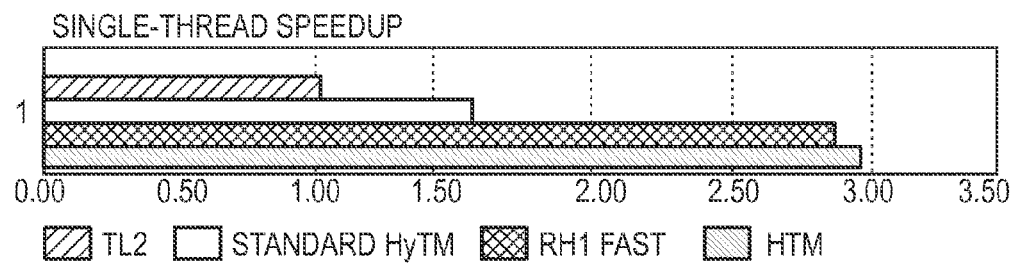
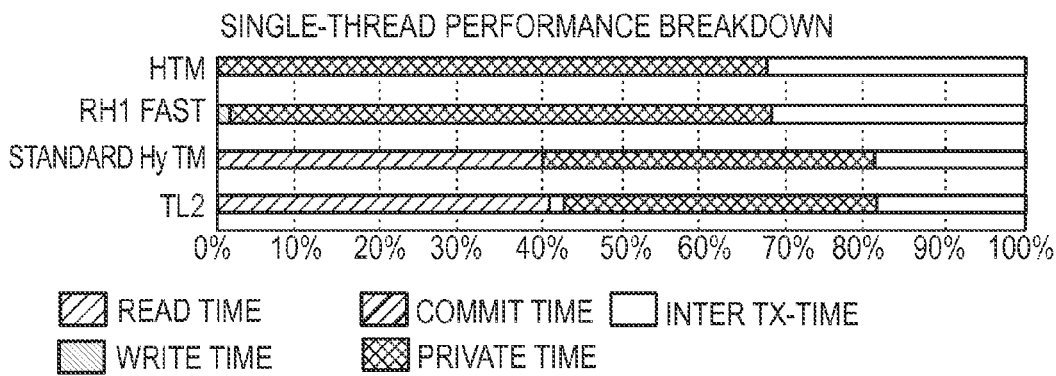
FIG. 20A
FIG. 20

RH NORec fast-path transaction

1: function FAST_PATH_START(ctx)
      ▷ no instrumentation - only start the hardware transaction
      HTM_Start()
2: 
3: end function
4: 
5: function FAST_PATH_WRITE(ctx, addr, value)
      ▷ no instrumentation - simply write the location
      store (addr, value)
6: 
7: end function
8: 
9: function FAST_PATH_READ(ctx, addr)
      ▷ no instrumentation - simply read the location
      return load (addr)
10: 
11: end function
12: 
13: function FAST_PATH_COMMIT(ctx)
      ▷ increment the global clock to notify other transactions about possible update to the memory
      global_clock ← global_clock + 1
      HTM_Commit()
14: 
15: 
16: end function

FIG. 22

RH NORec mixed slow-path transaction

```
 1: function SLOW_PATH_START(ctx)
 2:     ctx.tx_version ← global_clock
 3: end function
 4:
 5: function SLOW_PATH_WRITE(ctx, addr, value)
 6:     ctx.write_set ← ctx.write_set ∪ {addr, value}      ▷ add to write-set
 7: end function
 8:
 9: function SLOW_PATH_READ(ctx, addr)
10:     if addr ∈ ctx.write_set then                        ▷ check if the location is in the write-set
11:         return the value from the write-set
12:     end if
13:     cur_value ← load (addr)                             ▷ log the read and revalidate if required
14:     ctx.read_set ← ctx.read_set ∪ {addr, cur_value}
15:     if ctx.tx_version ≠ global_clock then
16:         ctx.tx_version ← global_clock
17:         if ¬revalidate_read_set_value_based(ctx) then
18:             stm_abort(ctx)
19:         end if
20:     end if
21:     return cur_value
22: end function
23:
24: function SLOW_PATH_COMMIT(ctx)
25:                                                         ▷ read-set revalidation
26:     label: start_revalidate
27:     if ctx.tx_version ≠ global_clock then
28:         ctx.tx_version ← global_clock
29:         if ¬revalidate_read_set_value_based(ctx) then
30:             stm_abort(ctx)
31:         end if
32:     end if
33:     HTM_start()
34:                                                         ▷ write the values
35:     for addr, new_value ∈ ctx.write_set do
36:         store(addr,new_value)
37:     end for
38:                                                         ▷ verify that read-set revalidation is still valid and update the clock
39:     if ctx.tx_version ≠ global_clock then
40:         htm_abort(ctx)
41:     end if
42:     globalclock ← global_clock + 1
43:     HTM_Commit()
44:     if the HTM failed NOT due to capacity then
45:         goto start_revalidate
46:     else
47:         fallback to slow-slow mode
48:     end if
46: end function
```

FIG. 23

RH NORec modifications for the all-software slow fallback

1: function FAST_PATH_START(ctx)
2:    HTM_Start()
    ▷ Verify that there are no concurrent all-software write-backs in the process
3:    if is_taken(is_all_soft_lock) then
4:       HTM_Abort()
5:    end if
6: end function
7:
8: function SLOW_PATH_READ(ctx, addr)
9:    ......
10:    cur_value ← load(addr)
    ▷ Wait for concurrent all-software write-backs to finish
11:    while is_taken(is_all_so_soft_lock) do
12:       do nothing
13:    end while
14:    ......
15: end function
16:
17: function SLOW_PATH_COMMIT(ctx)
18:    ......
19:    HTM_Start()
20:    ▷ verifies that there is no all-software fallbacks
21:    if is_taken(is_all_soft_lock) then
22:       HTM_Abort()
23:    end if
24:    ......
25:    HTM_Commit()
26:    if the HTM failed NOT due to capacity then
27:       goto start_revalidate
28:    else   ▷ execute all-software commit
29:       Slow_Slow_commit(ctx)
30:    end if
31: end function
32:
33: function SLOW_SLOW_COMMIT(ctx)
34:    lock_acquire(is_all_soft_lock)
35:    if ¬ revalidate_read_set_value_based(ctx) then
36:       lock_release(is_all_soft_lock)
37:       stm_abort(ctx)
38:    end if
39:    for addr, new_value ∈ ctx.write_set do
40:       store(addr, new_value)
41:    end for
42:    global_lock ← global_clock + 1
43:    lock_release(is_all_soft_lock)
44:
45: end function

FIG. 24

RH NORec optimization - using non-speculative operations

```
1: function SLOW_PATH_OPT_COMMIT(ctx)
       ▷STEP 1: put the write-set locations into speculation (to be monitored
   by HTM), and suspend HTM
2:     HTM_Start()
3:     for addr ∈ ctx.write_set do
4:         cur_value ← load(addr)
5:         store (addr, cur_value)
6:     end for
7:     HTM_Suspend
       ▷STEP 2: perform read-set revalidation outside HTM
8:     if ctx.tx_version ≠ global_clock then
9:         ctx.tx_version ← global_clock
10:        if ¬ revalidate_read_set_value_based(ctx) then
11:            stm_abort(ctx)
12:        end if
13:    end if
       ▷STEP 3: resume HTM and finish
14:    HTM_Resume
15:    for addr, new_value ∈ ctx.write_set do
16:        store (addr, new_value)
17:    end for
18:    global_clock ← global_clock + 1
19:    HTM_Commit()
20:    if the HTM failed NOT due to capacity then
21:        goto STEP 1
22:    else
23:        fallback to slow-slow mode
24:    end if
25: end function
26:
```

FIG. 25

METHODS AND SYSTEMS FOR ENHANCING HARDWARE TRANSACTIONS USING HARDWARE TRANSACTIONS IN SOFTWARE SLOW-PATH

CROSS-REFERENCE TO RELATED APPLICATIONS

This application claims priority to and the benefit of U.S. Provisional Patent Application No. 61/739,947, filed Dec. 20, 2012, and entitled "Method for Enhancing the Performance of Hardware Transactions Using Hardware Transactions"; U.S. Provisional Patent Application No. 61/832,250, filed Jun. 7, 2013, and entitled "Method for Enhancing Hardware Transactions Using Hardware Transactions in Software Slow-Path"; and U.S. Provisional Patent Application No. 61/840,104, filed Jun. 27, 2013, and entitled "Method for Enhancing Hardware Transactions Using Hardware Transactions in Software Slow-Path," the entireties of which are hereby incorporated by reference herein.

STATEMENT REGARDING FEDERALLY SPONSORED RESEARCH OR DEVELOPMENT

This invention was made with government support under Grant No. CCF1217921 awarded by the National Science Foundation. The government has certain rights in the invention.

TECHNICAL FIELD

The present disclosure relates generally to transactional memory and, in particular, to methods and systems for executing transactions in a mixed hardware-software path that includes a short hardware transaction.

BACKGROUND

Future processors are expected to have hardware support for best-effort hardware transactional memory (HTM). Best-effort HTMs impose limits on hardware transactions, but eliminate the overheads associated with loads and stores in software transactional memory (STM) implementations. Because it is possible for HTM transactions to fail for various reasons, a hybrid transactional memory (HyTM) approach exists that supports a best effort attempt to execute transactions in hardware, yet always falls back to slower all-software transactions in order to provide better progress guarantees and the ability to execute various systems calls and protected instructions that are not allowed in hardware transactions.

For many years, the accepted wisdom has been that the key to adoption of best-effort hardware transactions is to guarantee progress by combining them with an all software slow-path, to be taken if the hardware transactions fail repeatedly. However, all known generally applicable hybrid transactional memory solutions suffer from a major drawback: the coordination with the software slow-path introduces an unacceptably high instrumentation overhead into the hardware transactions. What is needed, then, is a hybrid transactional memory solution with a hardware fast-path that overcomes these deficiencies.

SUMMARY

Described herein in various implementations is a new approach to hybrid transactional memory (TM) algorithms in which a hardware transaction is included in a software slow-path and, by doing so, overhead instrumentation can be removed from a hardware fast-path. As a result, the hardware fast-path is made almost as fast as a pure hardware transactional memory path.

In one aspect, a system includes a processor and a memory storing computer-executable instructions that, when executed by the processor, configure the system to perform operations. The system receives a transaction to be executed and initially attempts to execute the transaction in a hardware path. Upon a failure to successfully execute the transaction in the hardware path, the system attempts to execute the transaction in a hardware-software path. The hardware-software path includes a software path and at least one hardware transaction.

In various embodiments, the system includes one or more of the following features. The system includes a shared memory space partitioned into a plurality of logical stripes that each include an associated metadata entry. Transactions executed by the system communicate with each other using the metadata entries. Reads of the shared memory space executed in the hardware path do not require inspection of the metadata entries. Writes to the shared memory space executed in the hardware path do not require conditional branching based on the metadata entries. The hardware transaction is atomic. In executing the transaction in the hardware-software path, the system is configured to execute a software transactional memory transaction in the software path while postponing writes until a commit phase and, in the commit phase, perform the writes in the hardware transaction. In executing the transaction in the hardware-software path, the system is further configured to perform a commit validation in the commit phase. Upon a failure to successfully execute the hardware transaction, the system is configured to attempt to re-execute the hardware transaction. Upon exceeding a threshold number of failures to successfully execute the hardware transaction, the system is further configured to execute the transaction in a full software path. The at least one hardware transaction includes a single hardware transaction. The at least one hardware transaction includes a plurality of hardware transactions. The at least one hardware transaction includes fewer operations than the hardware path.

In another aspect, in a system that includes a memory storing computer-executable instructions, a method includes executing the instructions by at least one processor, which results in operations that include: receiving a transaction to be executed; initially attempting to execute the transaction in a hardware path; and, upon a failure to successfully execute the transaction in the hardware path, attempting to execute the transaction in a hardware-software path. The hardware-software path includes a software path and at least one hardware transaction.

In various embodiments, the method includes one or more of the following features. The method further includes accessing a shared memory space partitioned into a plurality of logical stripes that each includes an associated metadata entry. Executed transactions communicate with each other using the metadata entries. Reads of the shared memory space executed in the hardware path do not require inspection of the metadata entries. Writes to the shared memory space executed in the hardware path do not require conditional branching based on the metadata entries. The hardware transaction is atomic. Executing the transaction in the hardware-software path includes executing a software transactional memory transaction in the software path while postponing writes until a commit phase and, in the commit phase, performing the writes in the hardware transaction. Executing the transaction in the hardware-software path further includes performing a commit validation in the commit phase. Upon a failure to successfully execute the hardware transaction, the method includes attempting to re-execute the hardware transaction. Upon exceeding a threshold number of failures to successfully execute the hardware transaction, the method further includes executing the transaction in a full software path. The at least one hardware transaction includes a single hardware transaction. The at least one hardware transaction includes a plurality of hardware transactions. The at least one hardware transaction includes fewer operations than the hardware path.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, emphasis instead generally being placed upon illustrating the principles of the invention.

FIG. 2 is an example implementation of main functions for the HCL slow-path.

FIG. 3 is an example implementation of locking and visibility functions for the HCL slow-path.

FIG. 4 is an example implementation of main functions for the HCL fast-path.

FIG. 5 is an example implementation of a slow-slow-path fallback function for the HCL slow-path.

FIG. 6 is an example implementation of a start function for the HCL fast-path and functions for the HCL slow-slow-path.

FIG. 12 is an example implementation of functions for the RH1 fast-path.

FIG. 13 is an example implementation of functions for the RH1 slow-path.

FIG. 14 is an example implementation of functions for the RH1 fast-path and slow-path modifications for switching to the RH2 algorithm.

FIG. 15 is an example implementation of functions for the RH2 fast-path.

FIG. 16 is an example implementation of functions for the RH2 slow-path.

FIG. 17 is an example implementation of functions for the RH2 fast-path-slow-read.

FIG. 18 is an example implementation of functions for the RH2 slow-path.

FIG. 22 is an example implementation of functions for the RH NORec fast-path.

FIG. 23 is an example implementation of functions for the RH NORec mixed slow-path.

FIG. 24 is an example implementation of functions for the RH NORec all-software slow fallback path.

FIG. 25 is an example implementation of functions for RH NORec optimization.

DETAILED DESCRIPTION

1. Introduction

Figure 1:
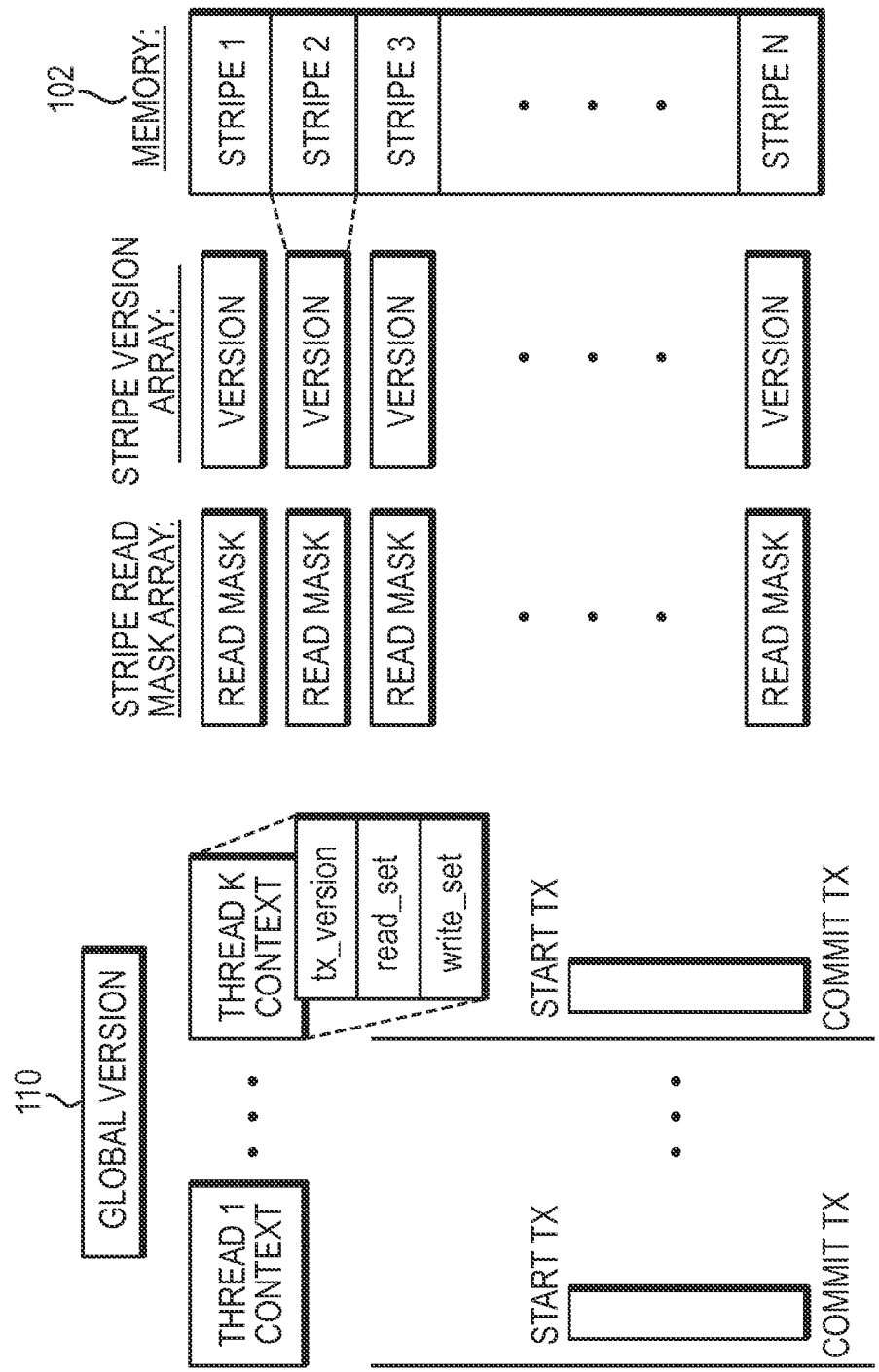
FIG. 1 is an example diagram of global and local variables used by the HCL algorithm.

The present disclosure describes implementations of a hybrid transactional memory (TM) method and system in which a hardware transaction is included in a software slow-path, allowing overhead instrumentation to be excluded from a hardware fast-path. The result is a hardware fast-path that is substantially as fast as a pure hardware transactional memory path.

One approach described in the present disclosure is Hardware Committed Locking (HCL). In HCL, a hardware commit is introduced into the software slow-path, creating a mixed hardware-software path, and allowing the instrumentation overhead to be removed from all hardware reads (typically 80% of memory accesses) and the branching logic to be removed from the hardware writes. The hardware commit in the HCL slow-path, performed under software locks, is short and repeatable, guaranteeing a high success rate, and easily defaulting to a rarely used all-software slow-slow-path. As described below, in a set of emulated benchmarks the new instrumented HCL hardware fast-path is almost as fast as the pure HTM. This is a significant improvement over traditional hybrid transactional memory algorithms whose instrumentation of hardware reads and writes makes the hardware fast-path in some cases almost as slow as the software slow-path.

Another approach described herein is referred to as reduced hardware (RH) transactions. Instead of an all-software slow path, in RH transactions part of the slow-path is executed using a smaller hardware transaction, creating a mixed hardware-software path. The purpose of this hardware component is not to speed up the slow-path (though this is a side effect). Rather, in using it almost all of the instrumentation is eliminated from the common hardware fast-path, making it virtually as fast as a pure hardware transaction. Moreover, the "mostly software" slow-path is obstruction-free (no locks), allows execution of long transactions and protected instructions that typically cause hardware transactions to fail, allows complete concurrency between hardware and software transactions, and uses the shorter hardware transactions only to commit. Further, it is simple to default to a mode allowing an all-software slow-slow mode in case the "mostly software" slow-path fails to commit.

In another approach, this disclosure presents a reduced-hardware (RH) version of the No Ownership Records (NORec) Hybrid TM algorithm. Instead of an all-software slow path, in RH transactions, part of the slow-path is executed using a short hardware transaction, creating a mixed hardware-software path. The purpose of this hardware component is not to speed up the slow-path (though this is a side effect). Rather, by using the hardware component, virtually all of the instrumentation from the common hardware fast-path can be eliminated, requiring the fast-path to only access the shared "clock" of the NORec STM at the end of the hardware transaction. This improves on all prior work by providing for a Hybrid Transactional memory that provides opacity with low hardware abort rates. Moreover, the "mostly software" slow-path is obstruction-free (no locking), allows complete concurrency between hardware and software transactions, and uses the short hardware transactions only to write values during the software commit. A simple slow-slow path can be used in the unlikely case that both the hardware and mostly software path fails.

2. Hardware Committed Locking

In one implementation, hereinafter referred to as hardware committed locking (HCL), a hybrid transactional memory system includes a short hardware transaction element in the software slow-path (thus creating a mixed software-hardware path) and software TM algorithmic elements in the hardware fast-path. The hardware transaction element in the mixed software-hardware path can be short, that is, including fewer operations than the software path portion of the mixed path. Operations can include standard instructions common to known instructions sets, such as read, write, move, compare, branch, conditional branch, and other data handling, control flow, and arithmetic and logic operators. Operations can also be complex, such as fetch-and-add, load-link/store-conditional, and compare and swap, and can include combinations of other instructions. Operations can be atomic or non-atomic. Operations can have varying instruction length, which can depend on the processor architecture, and can include multiple word length instructions. In some implementations, the hardware transaction in the mixed path spans multiple memory locations; thus a single memory location instruction such as a compare-and-swap, or even a double word compare-and-swap, in a software slow-path would not constitute a mixed software-hardware path.

On the slow-path, HCL runs a transactional locking STM transaction (such as Transactional Locking II (TL2)) while postponing all writes to the commit phase (commit-time-locking). In the commit phase, after performing a successful commit validation, and while locks are held, HCL performs all of the writes in one hardware transaction. This means that the slow-path software transactions are not pure software; rather, there is a mixed hardware-software path. However, this small change allows removal of the instrumentation for all of a hardware transaction's reads. Intuitively, this is because concurrent hardware transactions will either see all the new values or all the old ones, but will fail if they read both new and old versions of the updated values. The removal of instrumentation from reads is advantageous because it is accepted that the ratio of reads to writes in commercial software is about 4 to 1 (the 80/20 rule) and it is known that many real-world benchmarks that can benefit from TM are dominated by shared reads. As a secondary advantage, HCL also eliminates the conditional branches on writes in hardware transactions, so writes only need to load metadata, but do not need to branch on it.

The slow-path software transaction in HCL can perform the commit-time writes atomically. If the small transaction fails due to a concurrency conflict, then it can be safely re-executed again, since the write locations are locked and the commit validation has been done already. So, it can be retried again and again until it succeeds. The HCL slow-path is thus almost as fast as that of any state-of-the-art transactional locking based STM. A problem arises only when the failure reason is not contention, but some hardware limitation. However, these cases should be rare and, if they happen, the system can fall back briefly to another a slow-slow-path mode, where the failed software transaction's commit-time writes are performed in a standard way, write by write, and the hardware transactions' shared reads inspect all the STM metadata.

To make HCL work, a few additional new algorithmic elements can be included, which are described in detail below. Tracking and locking of the metadata lock states of write locations in the fast-path hardware commit are included, and, to the slow-path software transactions, a low cost mechanism that exposes the read-set during validation is included. As show herein (using carefully designed emulation due to the unavailability of transactional hardware), even with these added algorithmic mechanisms, the HCL hybrid transactional memory performs as well as pure HTM transactions on a variety of benchmarks including red-black trees, hash-tables, and linked lists, spanning the parallelism and transaction-length range.

2.1 HCL Algorithm Overview

A typical transaction reads and writes multiple locations. The read-set and write-set of the transaction are the sets of locations respectively read and written during execution. If a transaction involves only reads, it is referred to as a read transaction, and otherwise it is referred to as a write transaction. Transactional writes can be delayed until the commit phase, making the STM commit-time style, or can be performed directly to the memory, making the STM encounter-time.

We will now describe a version of the HCL hybrid TM based on a commit-time locking version of TL2. As in TL2, a metadata entry is assigned per memory location. The shared memory range is divided into logical stripes (partitions), each with a metadata entry. The software and hardware transactions communicate by inspecting and updating the metadata entries for the memory locations they read and write.

The software transactions maintain a consistent snapshot of the locations read by using a version-based consistency mechanism. Every memory stripe can be augmented with a local stripe version, which indicates the "last update time" of the memory stripe. Additionally, a global version clock is introduced. Transactions identify conflicts by reading the shared global version clock on start, and comparing it against the stripe version for every location read. If a location is overwritten after a transaction started, then it must abort, else the read locations form a consistent snapshot.

The main difficulty in implementing a hybrid TM is how to synchronize the memory updates of the hardware and software transactions. If a hardware transaction commits successfully, all of its memory updates become visible instantaneously. In contrast, the software transaction's memory updates are performed incrementally, one after the other, and the atomicity is guaranteed because they are locked using locks in their metadata entries. In order to prevent a hardware transaction from reading some locations before they are updated, and some after, traditional hybrid TM protocols instrument every hardware transaction read with a metadata inspection, to identify locations that are locked by a software transaction.

The present technique makes the hardware transaction reads execute at hardware speed, without any instrumentation. This is accomplished by deferring the software transaction writes to the commit phase, and performing all of the writes in a single hardware transaction. In this way, the software transaction updates become visible atomically to the system, and the hardware transactions can see either all of the software transaction's updates or none of them, but not a mix of old and new. As a result, the hardware transaction reads cannot see an inconsistent state, eliminating the need for inspecting the metadata on every hardware read.

But this is not enough for a serializable solution, because the hardware transactions do not perform read-set re-validations as the software transactions do. The following type scenario is thus possible: a software transaction arrives at the commit, locks its write-set and revalidates its read-set. Now, before the new values are actually written to the memory, a hardware transaction starts, reads a location that is currently locked, and decides to overwrite a location inside the read-set of this software transaction. Then, the hardware transaction commits successfully, and the software transaction finalizes the commit using an atomic memory writeback. In this scenario, one of the transactions must abort, yet both commit successfully.

The problem is that the un-instrumented hardware transaction reads cannot see that a location is currently being locked by a concurrent software transaction. To overcome this race, during the software transaction commit, the software transaction makes its read-set visible to the writes of the hardware transaction. In this way, hardware transactions cannot write to a read-set of a concurrently committing software transaction.

The read-set visibility can be implemented by adding a read mask for every memory stripe. The bits of the read mask are associated with threads: the transaction of thread K makes its read-set visible by setting the K-th bit of every read location's read mask. To set the K-th bit on and off, we use a non-blocking fetch-and-add synchronization primitive. In the presently described implementation, we use a 64-bit read mask to represent 64 active threads, and a fetch-and-add atomic primitive to turn the read mask's bits on and off. For larger thread numbers, additional read masks are required. A hardware transactions collects a write-set, and inspects the read masks of the locations in the write-set before committing. It sums up the total of all mask bits and aborts the transaction if this sum is greater than zero, that is, one of the mask's bits was made non-zero by some concurrent software transaction.

Usually, making an STM's reads visible results in poor performance, since every STM read is augmented with a write to shared memory. In the present implementation, the read visibility works differently, because it is applied during the commit phase of the software write transactions. Any other transactions, hardware or software read-only, are not performing this visibility procedure, and do not pay any additional overhead for their reads. Additionally, we use an efficient fetch-and-add synchronization primitive to update locations' read masks, instead of using a compare-and-swap (CAS) operation that can fail multiple times before turning on the required bit. As a result, our software transactions with a commit-time visible read-set have nearly the same performance as that of state-of-the-art STMs.

The hardware transactions on the other hand are not pure anymore. However, we have not instrumented any of the reads, and the instrumentation of the writes includes a load of metadata but does not include an expensive branch per write. As a result, our hardware transactions have in many cases nearly the same performance as that of pure hardware.

2.2 HCL Algorithm Details

FIG. 1 depicts the global and thread local variables used by the HCL algorithm. The memory range 102 is divided into logical stripes (partitions), each with a stripe version and a stripe read mask. Additionally, a global version counter 110 is used to coordinate the transactions, and each thread is associated with a thread local context that includes: tx_version, the global version read on transaction start; read_set, a buffer of the locations read; and write_set, a buffer of the locations written. In this implementation, the versions are 64-bit unsigned integers, initialized to zero. The read_set and the write_set can utilize any suitable list implementation.

The synchronization protocol is based on two basic mechanisms: (1) locking a location, and (2) making the location visible. The location's stripe version lowest order bit is reserved for locking. Transactions lock a location by setting the stripe version to the thread's lock value ctx.thread_id*2+1: that turns on the lowest order bit and encodes the thread id into the lock. The visibility of a location is represented by its read mask. Every bit of the read mask can be associated with some active thread, so a 64-bit read mask can hold information for 64 threads. In the present implementation the threads are assigned ids from 0 to 63, and these ids are used to "index" the read masks (more threads require more read masks per stripe). A thread with id K will turn on the K-th bit in the location's read mask to indicate that the thread is reading that location, and will reset this bit to remove this indication. We use the fetch_and_add( ) synchronization primitive to turn on and off bits in read masks, instead of using a CAS operation that can fail multiple times before actually succeeding (see FIG. 3).

The global version counter 110 is manipulated by the GVRead( ) and GVIncrement( ) methods, for reading and "incrementing" it, which can be implemented in different ways. The simplest is a shared counter that is read in every GVRead( ) call, and is incremented by 1 using a CAS in every GVIncrement. The present algorithm can also use various known efficient and cache-coherence friendly implementations.

FIG. 2 shows the implementation of the main software transaction functions; start, read, write and commit, which are based on additional functions shown in FIG. 3. Referring now to FIG. 2, software transactions start by reading the global version to their tx_version local variable (line 2). During the execution, the writes are deferred to the commit by buffering them to a local write-set (line 6), and scanning this write-set on every read operation (lines 10-11). If the read location is not found in the local write-set, then it is read directly from the memory, followed by a consistency check (lines 14-18). This check verifies that the read location is not locked, and that it has not been overwritten since the transaction has started, based on the following invariant: If the read location is in the process of being updated, then it will be locked, and if it has been already updated from the time the current transaction started, then the location's version must be greater than the transaction's version, tx_version. This invariant is ensured by the software commit protocol.

In a software transaction commit, the write-set locations are locked and the read-set is made visible (lines 29-30). Locking is done by setting the location's stripe version to the thread's lock value ctx.thread_id*2+1. This value turns on the lowest order bit, which is reserved for locking, and encodes the thread that locked the location. Location visibility is done by turning on the thread-associated bit in the location's read mask (shown in FIG. 3). Then, the next global version is generated (line 31), and the read locations are revalidated (line 32), ensuring they have not been overwritten from the transaction's start. After a successful revalidation, the new values are written-back to the memory by using a hardware transaction (line 33-42). If the hardware transaction fails due to contention reasons, then it is retried again, and otherwise the algorithm performs a fallback to the HCL-Slow-Slow variant described below. Else, on a successful write-back, the write locations are unlocked, by updating their versions to the new generated global version, and the read locations' visibility is removed, by turning off the thread-associated bit in every read location's read mask (shown in FIG. 3).

FIG. 4 shows the instrumentation for the hardware transaction API functions: start, read, write, and commit. The hardware transaction performs speculative reads and writes, where the writes are augmented with logging the addresses written (line 6) and the reads proceed as is, without any instrumentation. These reads cannot be inconsistent, because, as previously stated, the software transaction performs the actual memory writes using a small hardware transaction (FIG. 2, lines 33-42). Before committing, the hardware transaction verifies that the read masks of the write locations are all zero (lines 18-26), before initiating the HTM commit instruction. Additionally, the write locations are speculatively locked (lines 27-32), by writing the special thread lock-mask value to each one of them. Then the HTM commit instruction is executed, and on success, the write locations are updated and locked atomically. Finally, the next global version is generated and installed to the write location's stripe versions (lines 35-40). Note that the global version update is performed outside the hardware transaction, since accessing the global version in a speculative way would result in unnecessary false aborts of all of the transactions that currently read it.

2.3 Handling HCL Limitations—the HCL Slow-Slow-Path

The software write-back small hardware transaction can fail for various reasons. If it fails due to contention, then the hybrid can safely re-execute the small hardware transaction, because the commit is already validated and the locations are made visible and locked. The problematic case is a failure due to some hardware limitation that does not allow the small hardware transaction to commit. In this case the algorithm can fall back to a different mode in which it executes a variant of the hybrid we call HCL-Slow-Slow.

This switch is implemented by introducing an is_slow_slow global counter, which is read on every HCL Fast-Path transaction start, and incremented by the HCL Slow-Path transaction on fallback triggering, as a result of a failing atomic write-back, and decremented on commit finalization. When the HCL hardware transaction starts, the HCL chooses between the HCL-Fast-Path and HCL-Slow-Slow by testing this global counter. While this counter is non-zero, the HCL-Slow-Slow mode is executed instead of the HCL-Fast-Path. Since this variable will change only rarely (when the repeated short transaction on the slow path fails due to transactional limitations), reading its cached value introduces no real overhead, and once it is set, HCL-Fast-Path hardware transactions will all fail and switch to the slow-slow-path mode until the problematic transaction completes and the hardware reverts back to normal mode.

Our hybrid algorithm allows the hardware transaction's reads to proceed without any instrumentation, by deferring the software transaction's writes to the commit phase, and executing the their write-back to the memory using a shorter hardware transaction. If this shorter hardware transaction repeatedly fails, however unlikely this may be, then special handling is required to supply a complete solution.

HCL detects an unsuccessful write-back small hardware transaction by counting its aborts. When the abort count exceeds some predefined threshold, HCL falls back to the HCL-Slow-Slow variant. The fallback to HCL-Slow-Slow results in an abort of all currently executing HCL Fast-Path hardware transactions. As mentioned above, an is_slow_slow global counter is used, which can be read on every HCL Fast-Path hardware transaction's start, and written by the HCL Slow-Path transaction that triggers the fallback. On HCL hardware transaction start, the HCL chooses between the HCL-Fast-Path and HCL-Slow-Slow by testing this global variable. Since this variable will change only rarely (when the repeated short transaction on the slow path fails due to transactional limitations), reading its cached value introduces no real overhead.

A full fallback mechanism should take into account that a number of concurrent HCL Slow-Path transactions could decide to trigger to the HCL Slow-Slow-path, and allow fallback recovery, which will later return to the HCL Fast-Path execution. To support this, we use an is_slow_slow atomic counter. The HCL Slow-Path transaction that decides to fallback, executes an atomic increment of this global counter, and proceeds to perform its commit writes using the regular store instructions instead of a hardware transaction. Then, it atomically decrements the global counter, unlocks the write locations, and updates their stripe versions. Concurrent HCL Fast-Path transactions will switch and execute in the HCL Slow-Slow-Path mode as long as the global counter is not zero, and switch back to the Fast-Path when it becomes zero, allowing fallback recovery. Note, that in the Slow-Slow-Path this global counter is not read speculatively inside the slow-slow-path hardware transactions (the check is done before hardware HTM_Start( )), so the Slow-Slow-Path hardware transactions will not abort because of additional concurrent HCL-Slow-Path transactions that decide to fall back and increment the global counter.

FIG. 5 shows the small set of modifications required for the HCL Slow-Path commit, and FIG. 6 shows the HCL Slow-Slow-Path hardware transaction implementation, including the switching logic between the HCL Fast-Path and HCL Slow-Slow-Path. We can see that the hardware transactions of the HCL-Slow-Slow are implemented differently than those of the HCL-Fast-Path (FIG. 6). Before the hardware transaction start the global version count is read to the transaction's tx_version (line 15), and it is used in read operations to perform the snapshot consistency check (lines 25-32). Upon commit, there is no code for checking that the write locations are being read by a concurrent software transaction, because the read-set visibility is no longer required for correctness; but all else is the same as for HCL.

2.4 HCL Performance Evaluation

The hybrid TM HCL algorithm is evaluated by constructing a set of special benchmarks that can be executed on current multicore processors, that is, without the (yet unavailable) HTM support. The idea is to emulate an HTM transaction execution by running its logic and its reads and writes using plain loads and stores. There is no speculation, and the cache performance is obviously not the same because there is no HTM mechanism, but we believe that the transaction with plain reads and writes is close to being a lower-bound on the performance of a real HTM system.

The problem with executing non-instrumented transactions is that they cannot detect concurrent conflicts and maintain a consistent snapshot of the locations read. As a result, the non-instrumented transactions may crash and get into deadlocks. To avoid this problem, for every benchmark, we constrain the set of possible executions to the ones that will work correctly, and report the performance results for these specific executions. We try to make these executions as realistic as possible by emulating the expected abort ratio for every number of threads.

2.4.1 Red-Black Tree Emulation Overview

A standard red-black tree implementation exposes an interface of put, delete, and get operations. The put operation installs a key-value pair, if the key is present, else updates the key's node value. Delete removes the key's node, if present, and get returns the value associated with a key.

Our red-black tree implementation is different, referred to as a Constant Red-Black Tree. We allow only executions that are correct with non-instrumented transactions that simulate the HTM. We populate the RB-Tree with 100K nodes, and execute concurrent operations that do not modify the structure of the tree. Update operations only modify dummy variables inside the tree's nodes, while the lookups traverse the nodes and read these dummy variables, paying the cache-coherence traffic for their fake updates.

We expose a read-only and a write operation: rb-lookup (key), and rb-update(key, value). The rb-lookup(key) makes the usual tree traversal, looking for the node with the given key, and making 10 dummy shared reads per node visited. The rb-update(key, value) also executes the usual tree traversal to find the node with the given key, and then makes fake modifications. It writes a dummy value to the dummy variable in the node it found and its two children; it does not touch the pointers or the key value. To make the modifications mimic tree rotations, the operation makes the same fake modifications to triplets of nodes, going up from the node it found to the root. The number of nodes climbed up the tree is selected at random, so that getting to upper levels and the root will happen with diminishing probability, as in real tree implementation.

We estimate the expected abort ratio for a given execution, by first executing with a TL2 STM implementation. Then, we force the same abort ratio for the hybrid execution by aborting HTM transactions when they arrive at the commit. The STM abort ratio is only an estimate of the HTM abort ratio. Real HTM may add more aborts because of the internal hardware implementation limitations, or may reduce the number of aborts because of the reduced transaction execution window (hardware transactions execute faster); making them less vulnerable to conflict. Therefore, the STM abort ratio is likely somewhere in the middle.

2.4.2 Red-Black Tree Emulation Execution

The benchmark first creates a 100K nodes red-black tree, and then spawns the threads that execute the rb-lookup(key) and rb-update(key, value) operations as transactions. We vary the number of threads and the write ratio (the percentage of update transactions).

We execute the benchmarks on Intel 20-way Xeon E7-4870 chip with 10 2.40 GHz cores, each multiplexing 2 hardware threads (HyperThreading). Each core has a private write-back L1 and L2 caches and the L3 cache is shared.

The algorithms we benchmark are:

HTM—Hardware Transactional Memory without any instrumentation: all of the transactions are executed without instrumenting the reads and the writes. This represents the best performance that HTM can achieve.

Standard HyTM—The Standard Hybrid Transactional Memory: an HTM with instrumented read and write operations. This version retries aborted transactions in hardware mode only (no software mode penalty). Also the commit is immediate without any work. The hardware transaction reads and writes are minimally instrumented; each read and write accesses the STM metadata and creates a fake "if" condition check on its contents. The "if" condition does not change the execution logic; its only purpose is to show the resulting instrumentation overhead.

HCL Mixed—Hardware Committed Locking: Our new hybrid TM with hardware commit in the slow-path and uninstrumented hardware reads. This implementation uses both the all hardware fast-path and the mixed hardware-software slow-path.

HCL Fast—This is the HCL fast-path only. All of the aborts are retried in hardware mode.

HCL Slow—This is the HCL slow-path only. It is, as described earlier, a version of TL2 that in addition makes the read-set visible during the commit phase of the write transactions. This algorithm is used to measure the penalty of the read-set visibility addition relative to the standard TL2.

TL2—This is the standard TL2 STM implementation that uses a GV6 global clock.

Figure 7:
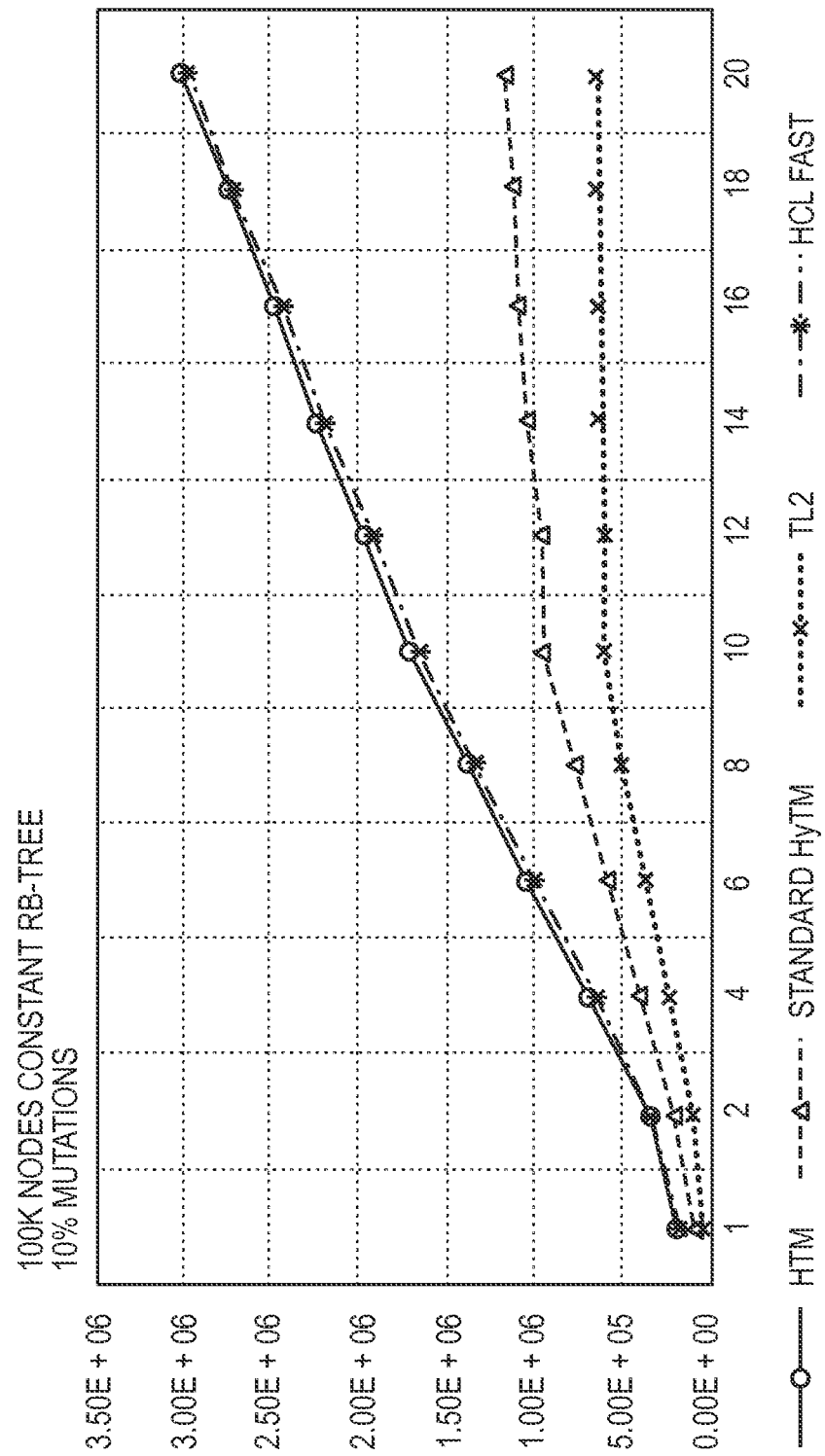
FIG. 7 is a graph showing results of a red-black tree emulation for various transactional memory algorithms.

Existing hybrid TM algorithms instrument the read and write operations of the hardware transaction. In contrast, our new hybrid TM executes the hardware reads without any instrumentation. Therefore, our first benchmark goal is to measure the cost of adding instrumentation to the hardware reads. FIG. 7 shows the penalties introduced by instrumenting the reads of the hardware transactions. Since we are only interested in the hardware read cost, this test is not using the slow-path software mode, and retries the hardware transactions in hardware mode only. The TL2 and HTM line graphs show the results for S™ and HTM executions respectively. The graph shows the throughput of 100K sized Red-Black Tree for 10% writes. The Y-axis denotes operations per second and X-axis the number of threads. In this test we can see that the standard Hybrid TMs eliminate the benefit that HTMs can achieve, because they instrument the reads and writes of the hardware transactions. In contrast, HCL preserves the HTMs benefit by avoiding hardware reads instrumentation. We can see that HTM performs 5-6× times faster than STM, and by adding instrumentation to the hardware reads in Standard HyTM, a dramatic performance penalty is introduced that makes HTM only 2× times faster than STM. In contrast, HCL Fast with the non-instrumented hardware reads, executes approximately at the same speed as HTM, and preserves the 5× factor speedup of the HTM.

Figures 8, 8A:
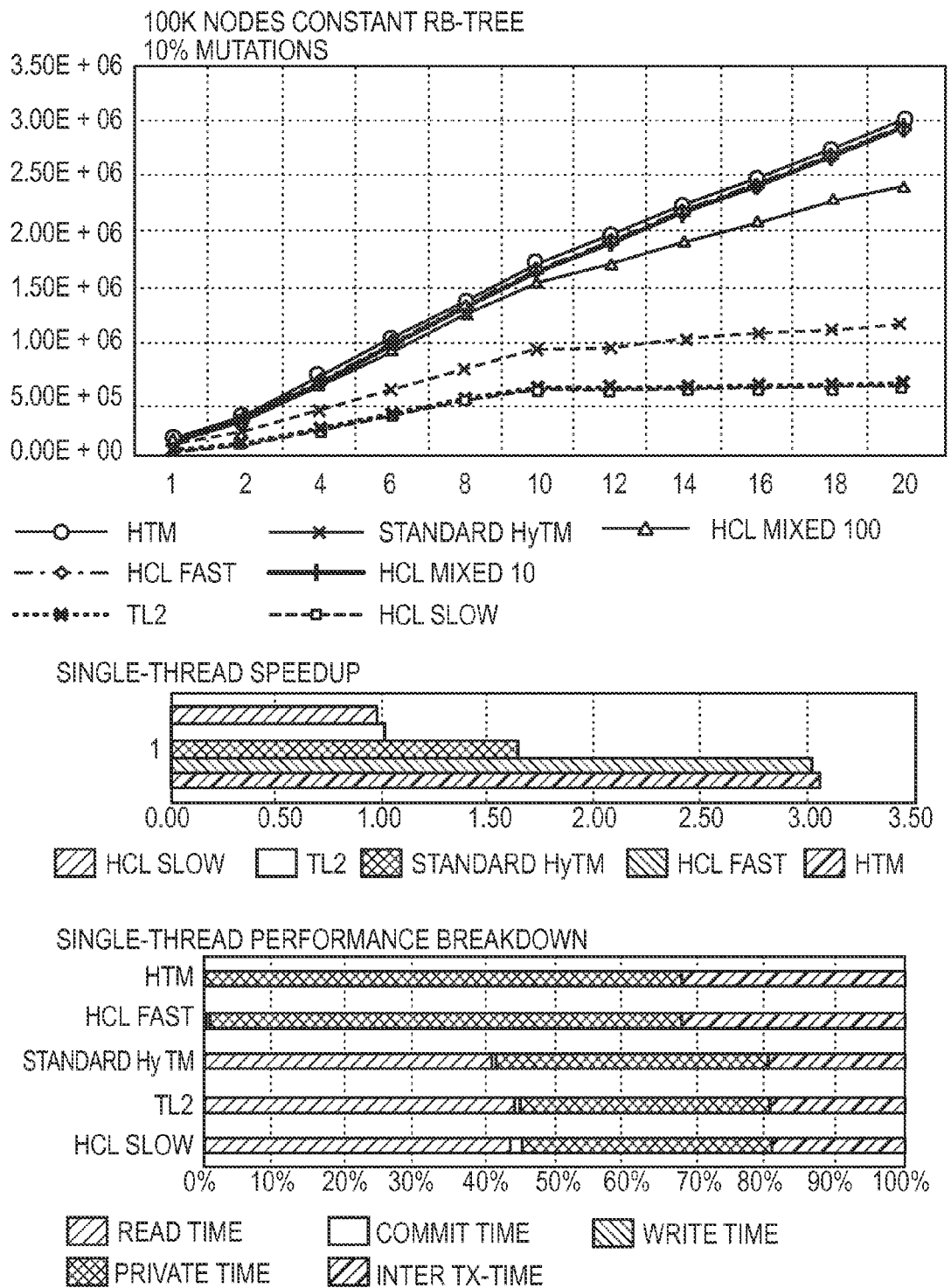
FIG. 8 is graphs showing results of red-black tree emulations for various transactional memory algorithms.

FIG. 8 shows the performance of the HCL Mixed algorithm that uses a slow-path with hardware commit for the aborted hardware transactions. The top graphs show the throughput of 100K sized Red-Black Tree for varying number of writes: 10% and 80%. The Y-axis denotes operations per second and X-axis the number of threads. The middle and the bottom graphs show the single-thread speedup and performance breakdown. HCL Mixed 0, HCL Mixed 10, and HCL Mixed 100 means that 0%, 10%, and 100% of the aborted transactions are retried in software mode respectively. We compare the different variants of the HCL Mixed to the best case Standard HyTM that uses only a hardware mode for its aborted transactions. For 10% writes, the HCL Mixed slow-path mode penalty is not significant, because the abort ratio is low (approximately 5%). But for the 80% writes case, where the abort ratio is high (approximately 40%), the software fallback introduces a significant penalty. Despite this, HCL Mixed 100 performs the same as Standard HyTM for the mix of 80% writes. Recall, that Standard HyTM uses only the hardware mode for the execution and its retries, and is still not performing better than HCL Mixed 100.

In order to understand the factors that affect the performance, we measured the single-thread speedups and the single-thread performance breakdowns of the different algorithms involved in FIG. 8. The single-thread speedup is normalized to the TL2 performance. They show the relative time used for the transactional read, write and commit operations, with the time used for the transaction's private code execution (local computations inside the transaction), and the time used for the inter-transactional code (code not inside a transaction). We can see that there is a correlation between the single-thread speedup and the algorithm's overall performance. Also, the single-thread breakdown shows that the read time is the dominating reason for the slowdown of the Standard HyTM relative to HCL.

Additionally, FIG. 8 compares the performance of the TL2 STM to the HCL Slow STM that is the slow-path for our HCL algorithm. Note that as in other benchmarks we do not simulate the hardware writes in the commit, but make sure that this does not affect the logic of our execution. Perhaps surprisingly, the HCL Slow performance is close to that of TL2, despite the fact that HCL Slow makes its read-set visible for the duration of the commit, by turning on bits for every read location read mask. Looking at the single-thread breakdowns reveals a more expensive commit operation for the HCL Slow algorithm, especially for the 80% writes case, but still it is not the performance dominating factor as the read operations instrumentation.

2.4.3 Hash Table Emulation

We implemented a Constant Hash Table benchmark using an approach similar to the one we used in the Constant Red-Black Tree. The benchmark populates 1000K distinct elements into the hash table. Then, the benchmark spawns the threads that execute the hash_query(key) and the hash_update(key, val) operations, where the number of updates is according to the writes ratio parameter. The hash_update makes a query for the given key, and when the node with the key is found, it updates to the dummy variables inside this node, without touching the structure (pointers) of the hash table.

Figure 9:
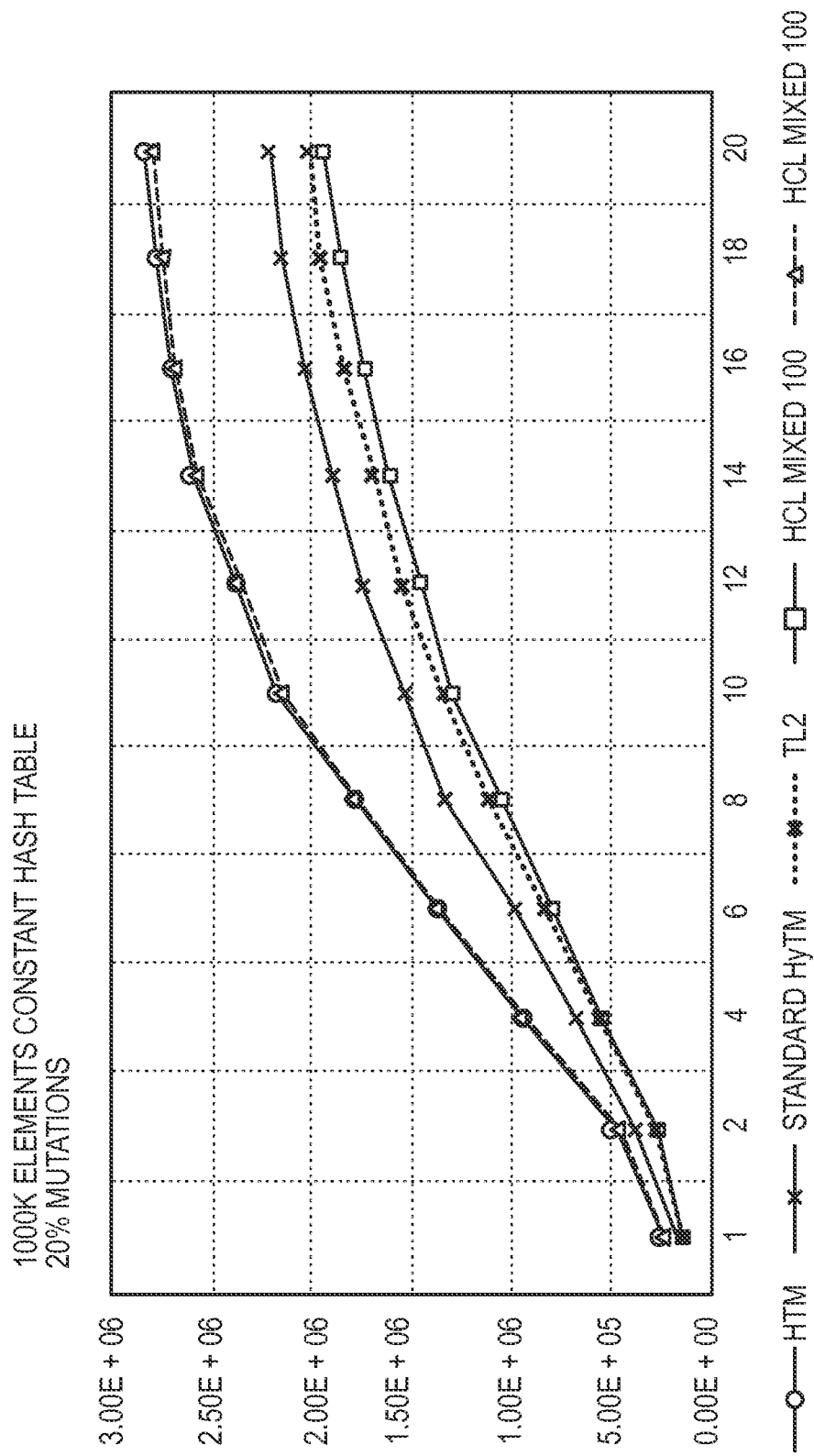
FIG. 9 is a graph showing results of a hash table emulation for various transactional memory algorithms.

FIG. 9 shows the hash table result line graphs for 20% writes. The graphs show the throughput of a 1000K-sized Hash Table for 20% of writes. The Y-axis denotes operations per second and X-axis the number of threads. This test represents short transactions with small STM overhead and low abort ratio. In contrast to the red-black tree, the hash table transactions are much shorter and introduce less STM overhead relative to the non-transactional code. As a result, for the hash table, HTM improves the TL2 STM performance by approximately 40%, where in the red-black tree it provides a 5× factor improvement. Additionally, the abort ratio is very small (approximately 3%) due to the highly distributed nature of hash table access. Still, the behavior of the Standard HyTM remains as low as that of the STM, while the HCL Mixed 100 preserve the HTM benefit over STM.

2.4.4 Sorted List Emulation

The Constant Sorted List benchmark creates a 1K distinct elements sorted list, and spawns the threads that execute the list_search(key) and the list_update(key, val) operations. The list_update searches for the node with the given key by a linear scan and then makes updates to the dummy variables inside this node, without touching the structure of the list.

Figure 10:
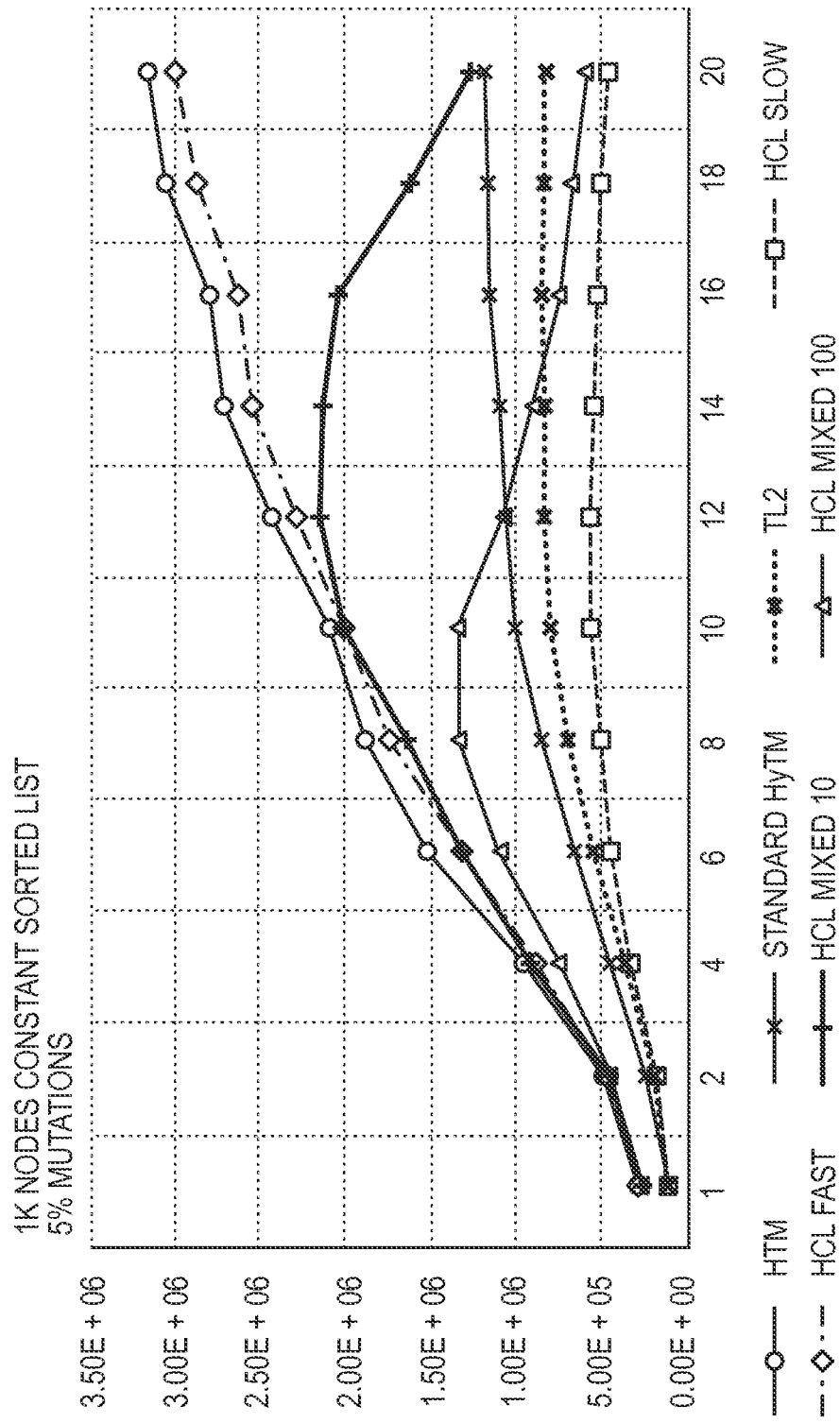
FIG. 10 is a graph showing results of a sorted list emulation for various transactional memory algorithms.

Referring now to FIG. 10, the graphs show the throughput of a 1K sized Sorted List for 5% of writes. The Y-axis denotes operations per second and X-axis the number of threads. This test represents a bad case for the STM and the Hybrid TMs, because the high abort ratio and the expensive STM transactions. The transactions are long, introducing a significant STM overhead, and are prone to aborts because the list_search(key) operation makes a linear scan that implies in a shared list prefix by all currently executing transactions. The abort ratio is approximately 50% for 20 threads. We can see that the HTM is 4× faster than the TL2 STM. HCL Slow performs 2× slower than TL2 due to the list prefix sharing by all of the transactions, which makes the visibility updates more expensive. As in the previous benchmarks, the Standard HyTM eliminates the HTM benefit and improves on the TL2 STM only by 50%, while the HCL Fast preserves the HTM speedup. The introduction of the software mode aborts in HCL Mixed 10 and HCL Mixed 100 degrades the hybrid performance for high number of threads.

2.4.5 Random Array Emulation—Measuring the Effect of the Reads/Writes Ratio

Recall that our HCL hybrid algorithm executes non-instrumented hardware reads, but instruments the hardware writes. A commonly accepted rule is that in real-world applications with transactions implementing method calls, the ratio of reads to writes is about 4 to 1 (20% writes). Still, because the writes inside the transaction are not free, it is interesting to see the effect of increasing their number inside a transaction. For this purpose, we construct a special Random Array benchmark.

The Random Array is a shared array with 128K entries. Transactions simply access random array locations to read and write, without any special additional logic. This setup allows us to control the transaction length and the number of reads and writes inside a transaction. All of the executions have 20 threads.

Figure 11:
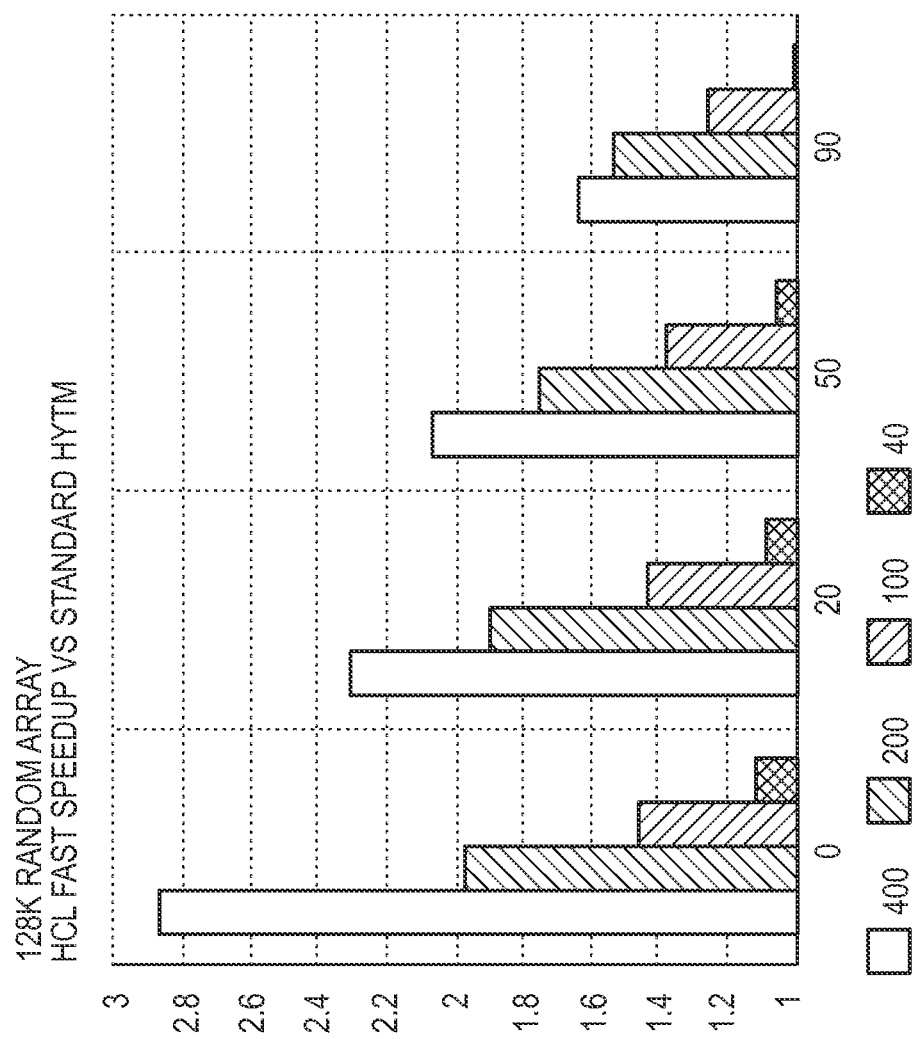
FIG. 11 is a graph comparing the HCL Fast algorithm speedup relative to the Standard HyTM algorithm.

FIG. 11 shows the speedup that HCL Fast gains over Standard HyTM for different transaction lengths (400, 200, 100 and 40 shared accesses) and writes to reads ratio inside a transaction (0%, 20%, 50% and 90% of writes). The Y-axis denotes the speedup, and the X-axis the proportion of the writes inside a transaction. We can see that for long transactions the speedup decreases as the fraction of writes increases. For short transactions, the speedup change is less significant, because the overall effect of the small transactions on the benchmark is much less than the long ones. The interesting result is that even mixes with 90% writes, HCL with sufficiently long transactions provides a good speedup of 1.3-1.7× relative to the Standard HyTM. The reason is the different cache-coherence behavior of the two algorithms. HCL does not read metadata on hardware reads, and only writes metadata on hardware writes. In contrast, Standard HyTM reads and writes the metadata on hardware reads and writes respectively. This introduces significantly more cache traffic between concurrently executing transactions, resulting in a performance degradation.

3 Reduced Hardware Transactions

Another implementation described in the present disclosure is referred to as reduced hardware (RH) transactions. RH transactions allow an extensive reduction of the instrumentation overhead of the hardware fast-path transactions on all upcoming architectures, without impairing concurrency among hardware and software transactions, and with various other scalability benefits.

As we noted earlier, all known HyTMs have the best-effort hardware fast-path default to a purely software slow-path if they fail repeatedly due to hardware constraints (These constraints can be the result of transactions that are simply too long, or because they call protected or OS related instructions that are simply not allowed in HTM). In an RH transaction protocol, instead of having the hardware fast-path default to a pure software slow-path, it defaults to a "mixed" path that consists mostly of software but also includes a shorter best-effort hardware transaction during the commit. Rather than improving the slow-path software's performance, by introducing this shorter hardware transaction into the software slow-path, we are able to remove most of the meta-data accesses and conditional branches from the common hardware fast-path, making it virtually as fast as pure hardware.

The RH1 protocol has a multi-level fallback mechanism: for any transaction it first tries a pure hardware fast path; If this fails it tries a new "mixed" slow-path, and if this fails, it tries an all software slow-slow-path.

On the slow-path, RH1 runs a global-time based STM transaction (such as TL2 or TinySTM) in which each memory location has an associated time-stamp that will be updated when written. The transaction body is executed purely in software, collecting read and write sets, and postponing the actual data writes to the commit phase. Importantly, the commit phase is executed in a single speculative hardware transaction: the read and write locations are validated based on an earlier read of the global clock, and if successful, the actual writes are applied to memory together with an updating of the time-stamps based on a new read of the global clock. Unlike TL2 or TinySTM, there are no locks (only time-stamps), and the transaction is obstruction-free.

The change in the slow-path allows the complete removal of all the testing and branching in the hardware fast-path for both reads and writes. The hardware fast-path transaction needs only to read the global clock (which is updated only rarely by concurrent slow-path transactions that happen to fail) and use it to update the time-stamps of locations it writes. Intuitively, this suffices because for any slow-path transaction, concurrent hardware transactions will either see all the new values written, or all the old ones, but will fail if they read both new and old versions because this means they overlapped with the slow-path's hardware commit. The writing of the new time-stamps on the fast path makes sure to fail inconsistent slow-path transactions.

Because in the slow-path the transaction body is executed purely in software, any system calls and protected instructions that might have failed the original hardware transaction can now complete in software before the commit point. Moreover, the RH1 slow-path hardware transaction simply validates the time-stamps of each location in the read-set (not the data itself), and writes each location in the write-set. The number of locations it accesses is thus linear in the size of the meta-data accessed, which is typically much smaller than the number of data locations accessed. For example, for the red-black tree, the read-set time-stamp meta-data is ¼ the size of the locations actually read, and we would thus expect the mixed slow-path to accommodate transactions that are 4× longer than the all-hardware fast-path.

If some slow-path transaction still fails to complete, it is easy to fall back briefly to a slow-slow-path mode, in which concurrent hardware and software both run a more complex protocol that allows software TL2 style transactions. Alternately, once could default first to a mode of running an alternative RH2 protocol which has a shorter hardware transaction on the slow-path rather than a full STM, and manages to avoid instrumenting reads in the fast-path hardware transactions.

In summary, the RH1 protocol allows virtually uninstrumented hardware transactions and mixed hardware-software slow-path transactions that (1) execute the transaction body fully in software (2), significantly extend the length of the transaction, (3) run concurrently with hardware fast-path transactions, and (4) provide obstruction-free progress guarantees. Our emulation results suggest that the RH1 protocol performs as well as pure HTM transactions on a variety of benchmarks including red-black trees, hash-tables, and linked lists, spanning the parallelism and transaction-length range.

3.1 RH1 Algorithm Overview

In a similar way to TL2, the shared memory range is divided into logical stripes (partitions), each with an associated metadata entry. The software and hardware transactions communicate by inspecting and updating the metadata entries for the memory locations they read and write. Each transaction has a pure hardware fast-path implementation, a mostly software slow-path implementation that uses a shorter hardware transaction for its commit protocol, and an all software slow-slow-path in case both of the others fail repeatedly.

Transactions can maintain a consistent snapshot of the locations read during their execution. To this end a global version clock is introduced, used by both fast and slow-path transactions to update local version time-stamps upon writing. Slow-path transactions identify conflicts by reading this shared global version clock on start, and comparing it against the stripe version for every location read. If a location is overwritten after a transaction started, then its timestamp will reflect this causing the transaction to abort, and otherwise the locations read form a consistent snapshot. In TL2 the transaction body is executed collecting a read set and a write set, then validating the time-stamps of all the locations in these sets, and writing the new values with increased time stamps. The TL2 software commit is executed after taking locks on all locations to be updated, but one of the advantages of the scheme here is that we will not need them.

Now, to achieve our goal of making the fast-path hardware transactions execute at hardware speed, we make two observations about a TL2 style Hybrid protocol executed in both hardware and software modes.

The first observation is that if we execute all the commit-time writes of the slow-path in a single hardware transaction, then in order to be consistent the fast-path hardware transaction does not need to do any testing of locations it accesses: it will either see all of them or none of them, since if it sees only part of them then the other transaction must have written concurrently and the hardware transaction will have a cache invalidation and abort.

The second observation is that if we have the hardware transaction update the time-stamps of the locations it writes using the latest value of the global version clock, then it will cause any concurrent software transaction that reads these locations to fail its commit time validation of the timestamps of its read and write sets.

There is one little caveat to this simple approach. The hardware transaction might manage to slip in the middle of the commit and write immediately after a successful validation and before all the updated writes are executed atomically in hardware. This can be prevented by holding locks on the locations to be written. In RH1 we do not use locks since they would have to be updated also in the hardware transaction, introducing an overhead. Instead, the solution is to have the validation and the write-back of the write-set values be part of one hardware transaction. With this change, we are guaranteed that the slow-path is also consistent. Below, we show the RH2 protocol that uses locks requires only the writes of data to be executed in a single hardware transaction, but introduces the added overhead into the hardware path in order to update the locks.

3.2 RH1 Algorithm Overview

The global stripe version array holds the stripe versions (time-stamps). Each thread is associated with a thread local context that includes: tx_version, the global version counter value read on transaction start, read_set, a buffer of the locations read, and write_set, a buffer of the locations written. All of the versions are 64-bit unsigned integers, initialized to zero, and the read_set with the write_set can be any list implementation.

The global version counter is manipulated by the GVRead( ) and GVNext( ) methods, for reading and "advancing" it, and we use the GV6 implementation that does not modify the global counter on GVNext( ) calls, but only on transactional aborts. This design choice avoids unnecessary aborts of the hardware transactions that call for GVNext( ) (speculate on the global clock), in order to install it to the write locations.

The algorithm in FIG. 12 shows the implementation of the RH1 fast-path transaction. The fast-path starts by initiating a hardware transaction (line 2). It performs the reads without any instrumentation (line 13), and the writes with minimal instrumentation that only updates the write location's version on every write (lines 6-8). On commit, it simply performs the hardware transaction commit instruction (line 17).

The algorithm in FIG. 13 shows the implementation of the RH1 slow-path. The slow-path starts by reading the global version to its local tx_version variable (line 2). During the execution, the writes are deferred to the commit by buffering them to a local write-set (line 6), and scanning this write-set on every read operation (lines 10-11). If the read location is not found in the local write-set, then it is read directly from the memory, followed by a consistency check (lines 14-18). This check verifies that the read location has not been overwritten since the transaction has started, based on the following invariant: If the read location has been already updated from the time the current transaction started, then the location's version must be greater than the transaction's version, tx_version. The fast-path and slow-path commits ensure this invariant. Finally, the slow-path commit executes a single hardware transaction that first performs the read-set revalidation, and then the write-back, that includes making the actual memory updates and installing of the next global version to the stripe versions of the write locations (lines 29-42).

3.3 RH1 Algorithm Limitations—Fallback to RH2 and the all-Software Slow-Slow-Path The RH1 slow-path commit executes a single hardware transaction that performs the read-set revalidation and the write-back. This hardware transaction may fail for various reasons. In the common-case, the failure reason will be contention, and some kind of contention management mechanism can be applied to handle the transactional retries. In more rare situations, the hardware transaction may fail due to some hardware limitation. Note, that this hardware transaction accesses a predefined memory range (the metadata range), and it performs only simple memory reads and writes. Therefore, on Intel architectures with RTM, the most likely reason for a constant failure of this transaction is a capacity overflow of the hardware reads buffer. In other words, the transaction metadata cannot fit in the L1 cache of the processor. To handle these cases, the algorithm performs a fallback to RH2 described below.

RH2 reduces the HTM requirements of the slow-path transactions by performing only the commit-time write-back in a single hardware transaction (not including the read-set revalidation). The core idea is to introduce locks to the fast-path and the slow-path, and force the slow-path to "expose" its read-set for the duration of the slow-path commit.

Still, one might worry about the progress guarantees of RH2, because the slow-path commit-time hardware transaction that performs the write-back atomically may fail. This would mean that the transaction's write-set cannot be accommodated inside the L1 cache of the processor, which is unlikely for real-world transactions. We show that in any case RH2 can easily fallback to a fully pure software slow-path in which it performs an all-software commit and the fast-path transactions inspect the metadata for every read and write, in a similar way to the standard hybrid TMs. The switch to fully software RH2 slow-path aborts the current RH2 fast-path transactions and restarts them in the RH2 fast-path-slow-read mode. We call this special mode the all software slow-slow-path.

RH1 uses a global is_RH2_fallback counter variable to perform the switch to the RH2 mode. The RH1 slow-path atomically increments this global counter before executing the fallback RH2 slow-path commit code and decrements it on fallback finish. As a result, the is_RH2_fallback counter indicates the number of currently executing RH2 slow-path transactions, and the RH1 fast-path transactions can use this global counter to decide when to execute the RH2 fast-path transactions. Upon the first is_RH2_fallback increment, all currently executing RH1 fast-path transactions must abort and restart in RH2 fast-path mode. For this purpose, the RH1 fast-path monitors this global counter for the duration of the transaction by speculatively reading this global counter and verifying its value is zero, immediately after the hardware transaction starts. In addition, before the hardware transaction starts, the RH1 fast-path checks this global counter to be greater than zero, and if so, then it executes the RH2 fast-path, else it runs the RH1 fast-path. The algorithm in FIG. 14 presents the RH1 fast-path and slow-path modifications that support the switching to the RH2 algorithm.

3.4 RH2 Algorithm Overview

The main difference between RH1 and RH2 is that RH2 uses locks for synchronization between the fast-path and the slow-path. The RH2 slow-path commit locks the write-set, revalidates the read-set, and then executes a small hardware transaction that performs the write-back. The RH2 fast-path writes inspect these locks, while the reads execute without any instrumentation. Now, since the RH2 slow-path is not executing the read-set revalidation inside a hardware transaction, a problematic scenario may occur between the fast-path and the slow-path as follows: a slow-path transaction arrives at the commit, locks its write-set and revalidates its read-set. Now, before the new values are actually written to the memory, a fast-path transaction starts, reads a location that is currently locked, and decides to overwrite a location inside the read-set of this slow-path transaction. Then, the fast-path transaction commits successfully, and the slow-path finalizes the commit using an atomic memory write-back. In this scenario, one of the transactions must abort, yet both commit successfully.

The problem is that the un-instrumented fast-path transaction reads cannot see that a location is currently being locked by a concurrent slow-path transaction. To overcome this race, during the slow-path commit, the transaction makes its read-set visible to the writes of the fast-path transaction. In this way, fast-path transactions cannot write to a read-set of a concurrently committing slow-path transaction.

The read-set visibility is implemented by adding a read mask for every memory stripe. The bits of the read mask are associated with threads: the transaction of thread K makes its read-set visible by setting the K-th bit of every read location's read mask. To set the K-th bit on and off, we use a non-blocking fetch-and-add synchronization primitive. In our implementation, we use a 64-bit read mask to represent 64 active threads, and a fetch-and-add atomic primitive to turn the read mask's bits on and off. For larger thread numbers, additional read masks are required.

A fast-path hardware transaction collects the write-set, and on commit, detects if there is a concurrent slow-path transaction executing. If so, it inspects the read masks of the locations in the write-set before committing. It sums up the total of all mask bits and aborts the transaction if this sum is greater than zero, that is, one of the mask's bits was made non-zero by some concurrent slow-path transaction.

Usually, making an STM's reads visible results in poor performance, since every STM read is augmented with a write to shared memory. In the present implementation the read visibility works differently, because it is applied only during the commit phase of the software write transactions. Any other transactions, hardware or software read-only, are not performing this visibility procedure, and do not pay any additional overhead for their reads. Additionally, we use an efficient fetch-and-add synchronization primitive to update locations' read masks, instead of using a CAS operation that can fail multiple times before turning on the required bit. As a result, our software transactions with a commit-time visible read-set have nearly the same performance as that of state-of-the-art STMs.

3.5 RH2 Algorithm Details

FIG. 15 and FIG. 16 show the RH2 fast-path and slow-path. FIG. 17 presents the fast-path-slow-read mode implementation for the pure software slow-path execution, and FIG. 18 presents slow-path additional helper functions, that implement the locking and visibility mechanisms.

In a similar way to RH1, the memory range is divided into logical stripes (partitions), each with a stripe version and a stripe read mask. Additionally, a global version counter is used to coordinate the transactions, and each thread is associated with a thread local context that includes: tx_version, the global version read on transaction start, read_set, a buffer of the locations read, and a write_set, a buffer of the locations written. All of the versions are 64-bit unsigned integers, initialized to zero, and the read_set and write_sets can be any list implementation.

The global version counter is manipulated by the GVRead( ) and GVNext( ) methods, for reading and "advancing" it, which can be implemented in different ways. We use the GV6 implementation that does not modify the global counter on GVNext( ) calls, but only on transactional aborts. This design choice avoids unnecessary aborts of the hardware transactions that call GVNext( ) (speculate on the global clock) in order to install it to the write locations.

The RH2 slow-path commit protocol is based on two basic mechanisms: (1) locking a location, and (2) making the location visible. The location's stripe version lowest order bit is reserved for locking. Transactions lock a location by setting the stripe version to the thread's lock value ctx.thread_id*2+1: that turns on the lowest order bit and encodes the thread id into the lock. The visibility of a location is represented by its read mask. Every bit of the read mask is associated with some active thread, so a 64 bit read mask can hold information for 64 threads. In the present implementation the threads are assigned ids from 0 to 63, and these ids are used to "index" the read masks (more threads require more read masks per stripe). A thread with id K will turn on the K-th bit in the location's read mask to indicate that it's reading it, and will reset this bit to remove this indication. We use the fetch_and_add( ) synchronization primitive to turn on and off bits in read masks, instead of using a CAS operation that can fail multiple times before actually succeeding (see implementation in FIG. 18).

FIG. 16 shows the implementation of the RH2 slow-path. The slow-path starts by reading the global version to its local tx_version variable (line 2). During the execution, the writes are deferred to the commit by buffering them to a local write-set (line 6), and scanning this write-set on every read operation (lines 10-11). If the read location is not found in the local write-set, then it is read directly from the memory, followed by a consistency check (lines 14-18). This check verifies that the read location has not been overwritten since the transaction has started, based on the following invariant: If the read location has been already updated from the time the current transaction started, then the location's version must be greater than the transaction's version, tx_version. The fast-path and slow-path commits ensure this invariant.

Upon RH2 slow-path commit, the write-set locations are locked and the read-set is made visible (lines 29-30). Locking is done by setting the location's stripe version to the thread's lock value ctx.thread_id*2+1. This value turns on the lowest order bit, the one reserved for locking, and encodes the thread that locked the location. Location visibility is done by turning on the thread-associated bit in the location's read mask (shown in FIG. 18). Then, the next global version is generated (line 44), and the read locations are revalidated (line 31), ensuring they have not been overwritten from the transaction's start. After a successful revalidation, the new values are written-back to the memory by using a hardware transaction (line 32-43). On a successful write-back, the write locations are unlocked, by updating their versions to the new next global version, and the read locations' visibility is removed, by turning off the thread-associated bit in every read location's read mask.

If the RH2 slow-path commit-time small hardware transaction fails due to contention reasons then it can be retried. Otherwise, all of the current fast-path transactions are aborted and restarted in the fast-path-slow-read mode, and the slow-path write-back is performed in pure software (lines 36-42). RH2 implements this switch through a global integer is_all_software_slow_path variable, which counts the number of slow-paths that currently execute the commit-time write-back in pure software. Current fast-path transactions monitor this global variable to be zero during their execution (by speculatively loading it), and on its modification (by the slow-path) automatically abort. On fast-path start, the transactions check this global variable, and if it is not zero, they switch to the fast-path-slow-read mode.

FIG. 15 shows the implementation of the RH2 fast-path hardware transaction. The fast-path performs speculative reads and writes, where the writes are augmented with logging the addresses written (line 13) and the reads proceed as is, without any instrumentation. These reads cannot be inconsistent, because, as we said, the slow-path transactions perform the actual memory writes atomically.

Finally, the fast-path commit verifies that the read masks of the write locations are all zero (lines 25-33), before initiating the HTM commit instruction. Additionally, the write locations are speculatively locked (lines 34-45), by verifying that they are not locked by others, and by writing the special thread lock-mask value to each one of them. Then the HTM commit instruction is executed, and upon success, the write locations are updated and locked atomically. Finally, it gets the next global version, and installs it to the write location (lines 48-52).

3.6 RH Performance Evaluation

The present hybrid TM implementation is evaluated using a set of special benchmarks that can be executed on current multicore processors, that is, without the (yet unavailable) HTM support. Our idea is to emulate an HTM transaction execution by running its logic and its reads and writes using plain loads and stores. There is no speculation, and the cache performance is not the same as with an HTM mechanism, but we believe that the transaction with plain reads and writes is close to being a lower-bound on the performance of a real HTM system.

The problem with executing non-instrumented transactions is that they cannot detect concurrent conflicts and maintain a consistent snapshot of the locations read. As a result, the non-instrumented transactions may crash and get into deadlocks. To avoid this problem, for every benchmark, we constrain the set of possible executions to the ones that will work correctly, and report the performance results for these specific executions. We try to make these executions as realistic as possible by emulating the expected abort ratio for every number of threads.

3.6.1 Red-Black Tree Emulation Overview

Our red-black tree implementation, the Constant Red-Black Tree, must allow only executions that are correct with non-instrumented transactions that simulate the HTM. We populate the RB-Tree with 100K nodes, and execute concurrent operations that do not modify the structure of the tree. Update operations only modify dummy variables inside the tree's nodes, while the lookups traverse the nodes and read these dummy variables, paying the cache-coherence traffic for their fake updates.

More precisely, we expose a read-only and a write operation: rb-lookup(key), and rb-update(key, value). The rb-lookup(key) makes the usual tree traversal, looking for the node with the given key, and making 10 dummy shared reads per node visited. The rb-update(key, value) also executes the usual tree traversal to find the node with the given key, and then makes fake modifications. It writes a dummy value to the dummy variable in the node it found and its two children; it does not touch the pointers or the key value. To make the modifications mimic tree rotations, the operation makes the same fake modifications to triplets of nodes, going up from the node it found to the root. The number of nodes climbed up the tree is selected at random, so that getting to the upper levels and the root will happen with diminishing probability, as in a real tree implementation.

We estimate the expected abort ratio for a given execution by first executing with the usual TL2 STM implementation. Then, we force the same abort ratio for the hybrid execution by aborting HTM transactions when they arrive at the commit. The STM abort ratio is only an estimate of the HTM abort ratio. Real HTM may add more aborts because of the internal hardware implementation limitations, or may reduce the number of aborts because of the reduced transaction execution window (hardware transactions execute faster); making them less vulnerable to conflict. Therefore, the STM abort ratio is probably somewhere in the middle.

3.6.2 Red-Black Tree Emulation Execution

The benchmark first creates a 100K node red-black tree, and then spawns the threads that execute the rb-lookup(key) and rb-update(key, value) operations as transactions. We vary the number of threads and the write ratio (the percentage of update transactions).

We execute the benchmarks on Intel 20-way Xeon E7-4870 chip with 10 2.40 GHz cores, each multiplexing 2 hardware threads (HyperThreading). Each core has a private write-back L1 and L2 caches and the L3 cache is shared.

The algorithms we benchmark are:

HTM—Hardware Transactional Memory without any instrumentation: all of the transactions are executed without instrumenting the reads and the writes. This represents the best performance that HTM can achieve.

Standard HTM—The Standard Hybrid Transactional Memory: This represents the best performance that can be achieved by current state-of-the-art hybrid TMs. To make the hybrid as fast as possible, we execute only the hardware mode implementation, by executing and retrying transactions only in hardware, without any software fallback. We implement the hardware mode transaction with instrumented read and write operations, and make the commit immediate without any work. The hardware transaction reads and writes are minimally instrumented; each read and write accesses the STM metadata and creates a fake "if" condition check on its contents. The "if" condition does not change the execution logic; its only purpose is to show the resulting instrumentation overheads that occur for the standard hybrid TMs.

RH1 Mixed—Reduced Hardware Transactions 1: Our new hybrid TM with hardware commit in the slow-path and uninstrumented hardware reads. This implementation uses both the all hardware fast-path and the mixed hardware-software slow-path.

RH1 Fast—This is the RH1 fast-path only. All of the aborts are retried in hardware mode.

TL2—This is the standard TL2 STM implementation that uses a GV6 global clock.

Figure 19:
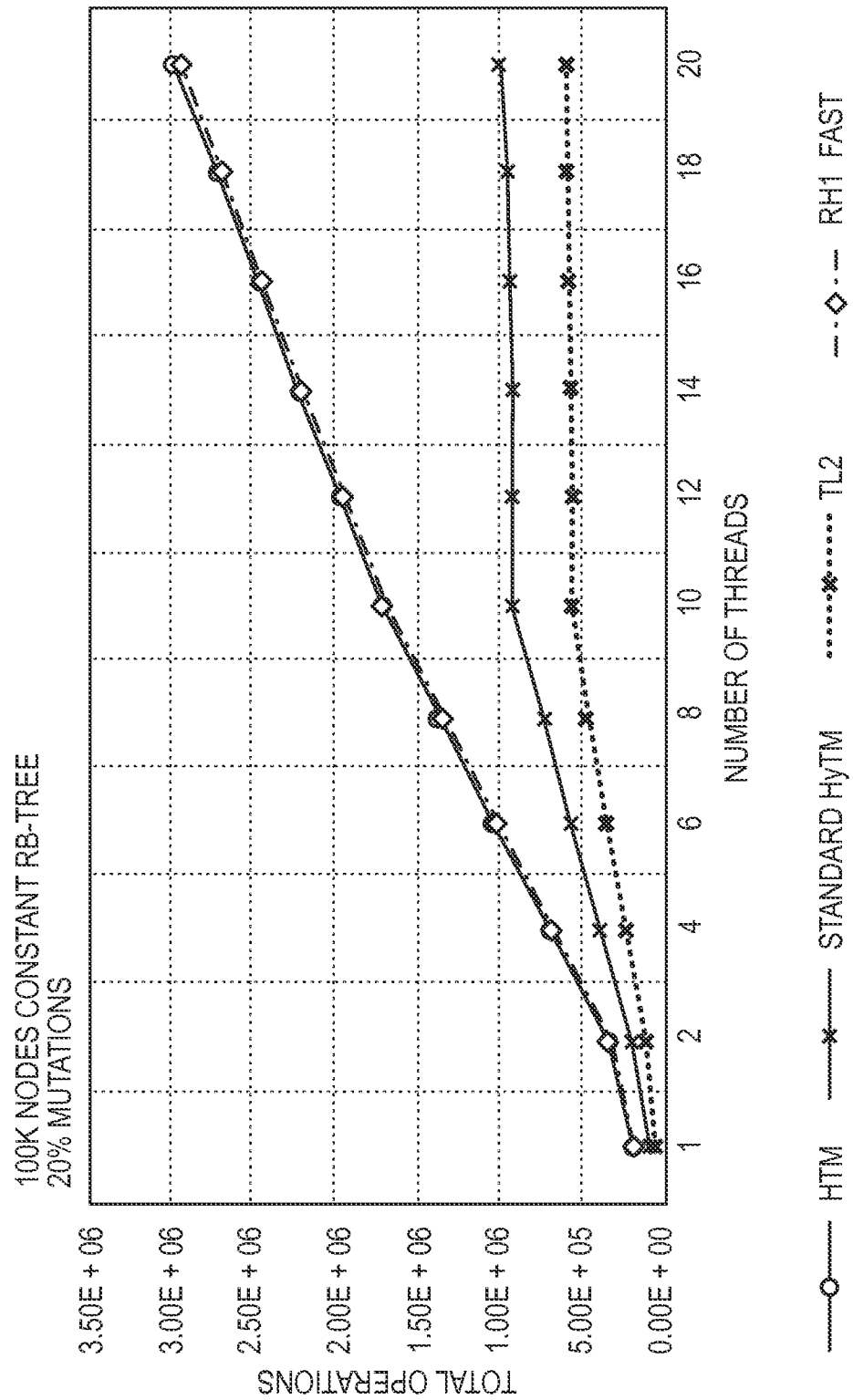
FIG. 19 is a graph showing results of a red-black tree emulation for various transactional memory algorithms.

The standard hybrid TM algorithms instrument the read and write operations of the hardware transaction. In contrast, our new hybrid TM executes the reads with no instrumentation and the writes with an additional write. Therefore, our first benchmark goal is to measure the cost of adding instrumentation to the hardware operations. FIG. 19 shows the penalties introduced by instrumenting the reads of the hardware transactions. The graphs show the throughput of 100K sized Red-Black Tree for 20% writes. Since, we are only interested in the hardware instrumentation overhead, this test is not using the RH1 slow-path mode, and retries the hardware transactions in fast-path mode only. The TL2 and HTM graphs show the results for S™ and HTM executions respectively. We can see that HTM performs 5-6× better than STM, and by adding instrumentation to the hardware reads in Standard HyTM, a dramatic performance penalty is introduced that makes HTM only 2× better than STM. In contrast, RH1 Fast with the non-instrumented hardware reads, executes approximately at the same speed as HTM, and preserves the 5× speedup of the HTM.

Figure 20B:
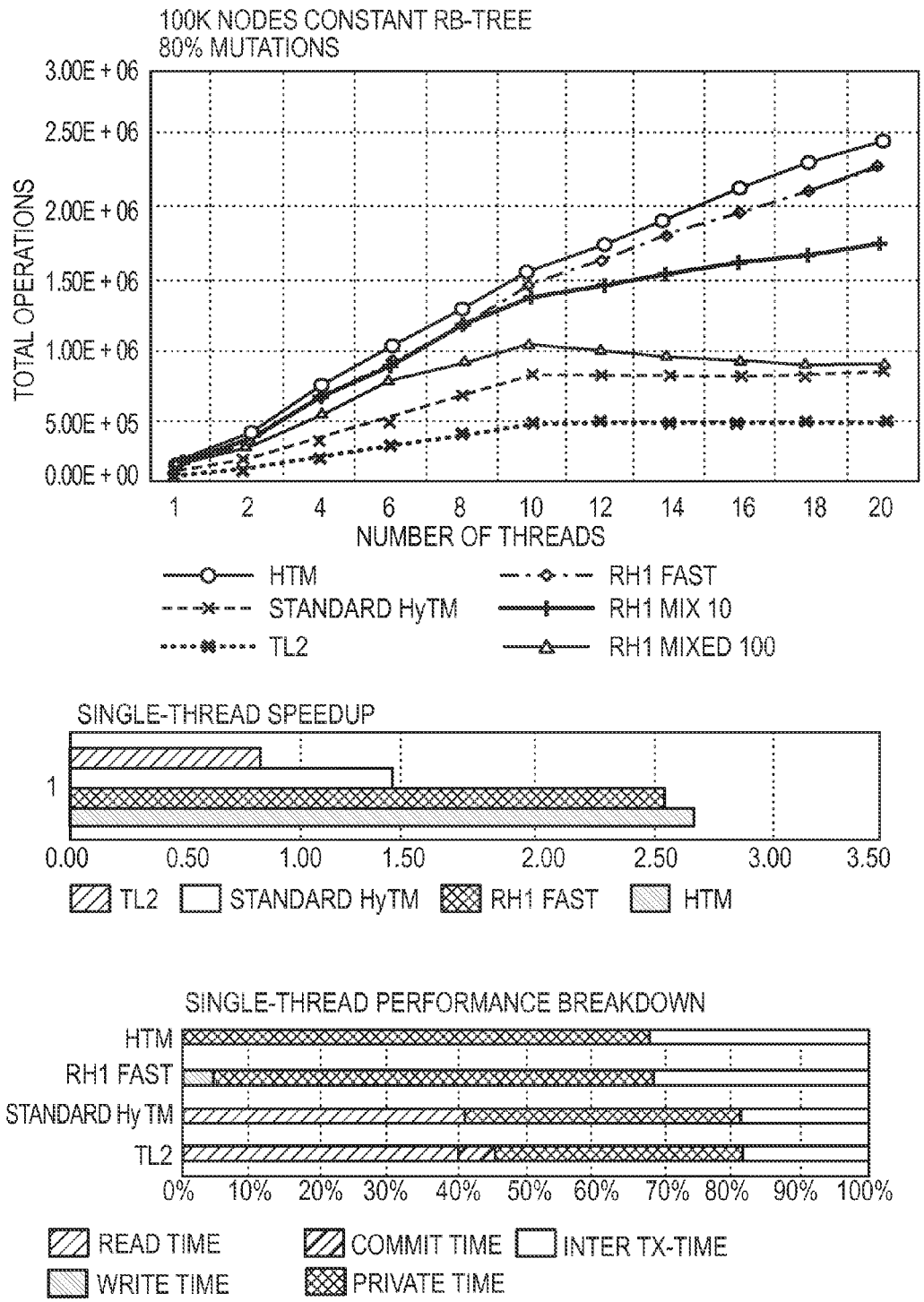
FIG. 20 is graphs showing results of a red-black tree emulation for various transactional memory algorithms.

FIG. 20 shows the performance of our RH1 Mixed that first tries the fast-path, and on abort, retries the transaction in the slow-path. The top graphs show the throughput of 100K sized Red-Black Tree for varying number of writes: 20% and 80%. The middle and the bottom graphs show the single-thread speedup and performance breakdown. RH1 Fast, RH1 Mixed 10, and RH1 Mixed 100 mean that 0%, 10%, and 100% of the aborted transactions are retried in the slow-path mode respectively. We compare the different variants of the RH1 Mixed to the best case Standard HyTM that uses only a hardware mode for its aborted transactions. For 20% writes, the RH1 Mixed slow-path mode penalty is not significant, because the abort ratio is low (approximately 5%). But for the 80% writes case, where the abort ratio is high (approximately 40%), the software fallback introduces a significant penalty. Despite this, RH1 Mixed 100 performs slightly better than the same Standard HyTM for the mix of 80% writes. Recall, that Standard HyTM uses only the hardware mode for its execution and retries, but still is slightly slower than RH1 Mixed 100.

In order to understand the factors that affect the performance, we measured the single-thread speedups and the single-thread performance breakdowns of the different algorithms involved in FIG. 20. The single-thread speedup is normalized to the TL2 performance. They show the relative time used for the transactional read, write and commit operations, with the time used for the transaction's private code execution (local computations inside the transaction), and the time used for the inter-transactional code (code not inside a transaction). We can see that there is a correlation between the single-thread speedup and the algorithm's overall performance. Also, the single-thread breakdown shows that the read time is the dominating reason for the slowdown of the Standard HyTM relative to RH1.

3.6.3 Hash Table Emulation

We implemented a Constant Hash Table benchmark using an approach similar to the one we used in the Constant Red-Black Tree. The benchmark inserts 1000K distinct elements into the hash table. Then, the benchmark spawns the threads that execute the hash_query(key) and the hash_update(key, val) operations, where the number of updates is defined by the writes ratio parameter. The hash_update makes a query for the given key, and when the node with the key is found, it updates to the dummy variables inside this node, without touching the structure (pointers) of the hash table.

Figure 21:
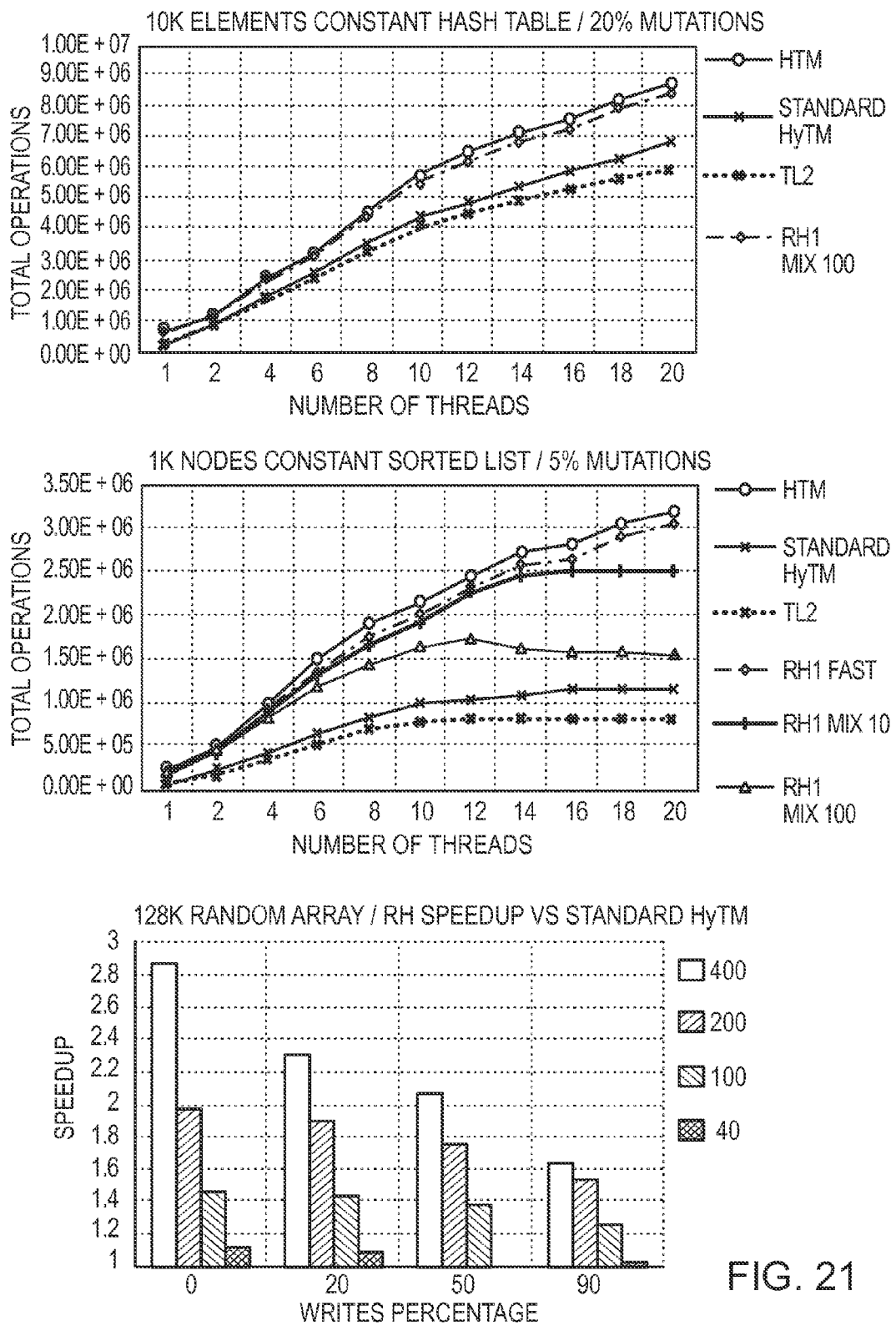
FIG. 21 is graphs showing results of hash table, sorted list, and random-array benchmarks for various transactional memory algorithms.

In FIG. 21, the left graph shows the hash table results for 20% writes. In contrast to the red-black tree, the hash table transactions are much shorter and introduce less STM overhead relative to the non-transactional code. As a result, for the hash table, HTM improves the TL2 STM performance by approximately 40%, where in the red-black tree it provides a 5× factor improvement. Additionally, the abort ratio is very small (approximately 3%) due to the highly distributed nature of hash table access. Still, the throughput of the Standard HyTM remains as low as that of the STM, while the RH1 Mixed 100 preserves the HTM's advantage over STM.

3.6.4 Sorted List Emulation

The Constant Sorted List benchmark creates a 1K sorted list of distinct elements, and spawns the threads that execute the list_search(key) and the list_update(key, val) operations. The list_update searches for the node with the given key by a linear scan, and then, makes updates to the dummy variables inside this node, without touching the structure of the list.

In FIG. 21, the middle graph shows the sorted list results for a mix that includes 5% writes. This benchmark represents a heavy-contended case for the STM. The transactions are long, introducing a significant STM overhead, and are prone to aborts because the list_search(key) operation makes a linear scan that implies in a shared list prefix by all currently executing transactions. The abort ratio is approximately 50% for 20 threads. We can see that the HTM is 4× faster than the TL2 STM. As in the previous benchmarks, the Standard HyTM eliminates the HTM benefit and improves on the TL2 STM by only 50%, while the RH1 Fast preserves the HTM speedup. The introduction of the software mode aborts in RH1 Mixed 10 and RH1 Mixed 100 degrades the hybrid performance for high number of threads.

3.6.5 Random Array Emulation—Measuring the Effect of the Reads/Writes Ratio

The RH1 fast-path executes instrumented writes with non-instrumented reads. A common rule is that in real-world applications with transactions, the ratio of reads to writes is approximately 4 to 1 (20% writes). Still, since in the RH1 fast-path writes are not free, it is interesting to see the effect of increasing their number inside a transaction.

The Random Array is a shared array with 128K entries. Transactions simply access random array locations to read and write, without any special additional logic. This setup allows us to control the transaction length and the number of reads and writes inside a transaction. All of the executions have 20 threads.

In FIG. 21, the right hand graph shows the speedup that RH1 Fast gains over Standard HyTM for different transaction lengths (400, 200, 100 and 40 shared accesses) and different write percentages inside a transaction (0%, 20%, 50% and 90% of writes). We can see that for long transactions the speedup decreases as the fraction of writes increases. For short transactions, the speedup change is less significant, because the overall effect of the small transactions on the benchmark is much less than that of the long ones. The interesting result is that even with mixes of 90% writes, RH1 with sufficiently long transactions provides a good speedup of 1.3-1.7× relative to the Standard HyTM. The reason is the different cache-coherence behavior of the two algorithms. RH1 does not read metadata on hardware reads, and only writes metadata on hardware writes. In contrast, Standard HyTM reads and writes the metadata on hardware reads and writes respectively. This introduces significantly more cache traffic between concurrently executing transactions, resulting in a performance degradation.

4 Reduced Hardware NORec

In another implementation, our RH NORec protocol has a multi-level fallback mechanism: for any transaction it first tries a pure hardware fast path; if this fails it tries a new mixed slow-path, and if this fails, it tries an all software slow-slow-path.

On the slow-path, RH NORec executes a standard NORec STM transaction. The transaction body is executed purely in software. It collects a read-set and a write-set, postpones the actual data writes to the commit phase, and performs current read-set value-based revalidation on every NORec global clock change. A key new element in RH NORec is that the commit-time write-back of the new values is executed within a single speculative hardware transaction. The commit saves the current global clock value, starts read-set value-based revalidation and then initiates a small hardware transaction, which first verifies that the current global clock is equal to the saved one. This clock check verifies that the read-set revalidation that was just performed is still valid within the hardware transaction. Then the small hardware transaction performs the writes of the write-set and updates the global clock. Unlike the original Hybrid NORec, there are no locks, and the slow-path transaction is obstruction-free. Moreover, the short hardware transaction can be repeated several times until it succeeds without any loss of correctness.

The change in the slow-path, namely, turning it into a mixed slow-path, allows us to implement the hardware fast-path transactions without reading the NORec global clock on every fast-path transaction start. Instead, the fast-path is only required to update the global clock upon every fast-path commit of a transaction (in actuality, it only needs to update it for transactions that write). As a result, the RH NORec avoids many of the original false aborts that limited Hybrid NORec's scalability. Intuitively, this update only during the commit suffices because for any slow-path transaction, concurrent hardware transactions will either see all the new values written, or all the old ones, but will fail if they read both new and old versions because this means they overlapped with the slow-path's hardware commit.

Because in the slow-path, the transaction body is executed purely in software, any system calls and protected instructions that might have failed the original hardware transaction can now complete in software before the commit point. In the commit point, the small hardware transaction performs only the actual writes, so the hardware requirements are reduced to be only the write-set locations, and there is no requirement to speculate on the read-set locations. Still, the commit write-back may fail due to hardware capacity limitations, because the write-set is too large; but these cases are usually rare, and if they happen the algorithm will, as we explain later, fallback to a slow-slow mode, where concurrent hardware and software transactions run the original Hybrid NORec.

4.1 RH NORec Algorithm Details

FIG. 22 shows the RH NORec fast-path implementation. On start, it initiates a hardware transaction (line 2), and during the execution performs completely pure reads and writes (line 10 and 6) without any instrumentation. On commit, it increments the global clock and commits the hardware transaction (lines 14-15). Note that for RH hybrid correctness, the global clock update at the fast-path commit is only required for a fast-path transaction that made a write, and only when there is a concurrent slow-path transaction.

FIG. 23 shows the RH NORec mixed slow-path implementation. On start, it reads the global clock to a local variable called tx_version (line 2). During the execution, the transaction performs its writes to a local write-set buffer (line 6), and on reads, it scans the write-set for the read locations (lines 10-11). If the read location is found in the write-set, then it returns its value from there. Otherwise it reads the read location from the memory, adds it to a read-set buffer, and verifies that the global clock has not been changed, by comparing it to the tx_version local variable. In case it detects a clock change, it triggers a read-set revalidation, and upon a successful read-set pass, the tx_version variable is updated to the new clock value (lines 13-21). On commit, the transaction samples the global clock to a local_global_clock local variable, and executes the read-set revalidation (lines 26-31). Then, it starts a small hardware transaction that verifies that the clock has not been changed, performs the actual writes, and increments the clock by one (lines 32-40). If the short hardware transaction fails, the transaction restarts the commit (lines 41-44). It is possible to restart as long as there is no real conflict (revalidation failure) or no real hardware limitation (capacity problem).

An important point of this design is that the hardware fast-path performs the global clock update only at the commit. This is possible due to the new mixed slow-path commit-time atomic write-back, which is done by using a small hardware transaction. The atomic slow-path write-back hides the intermediate updates, and exposes only all of the writes or none of them to the concurrent fast-path transactions. As a result, fast-path transactions cannot see partial updates of the slow-paths, which involve some new and some old values, and can see only all of the new values or all of the old ones. In contrast, the original Hybrid NORec slow-path commit write-back is executed piecemeal, write after a write, so it is possible for the fast-paths to see slow-paths partial updates, and it is necessary for the fast-paths to read the global clock on start, so that they will immediately detect and abort upon a slow-path update initiation.

4.1.1 Fallback to an all-Software Slow-Slow Path

RH NORec uses a small hardware transaction to perform the slow-path commit write-back atomically. This is important for the correctness of the hybrid protocol, and reduces the hardware requirements to be only the set of the write locations, not including the set of the read locations. Therefore, a constant failure of this small hardware transaction blocks the slow-path transaction from progress. This may happen due to some hardware limitation, for example when the set of the write locations cannot fit into the L1 cache. These situations are likely rare, but still may happen, and in this case we provide a slow-slow mode fallback for the RH-NORec protocol.

FIG. 24 shows the code modifications required to support the all-software slow-slow mode. When the slow-path commit detects a constant failure of the small hardware transaction (lines 26-29), it retries in a slow-slow commit mode where it acquires the global lock. Then, while the lock is taken, it performs the read-set revalidation, the write-back with global clock update, and the global lock release (lines 34-43). The hardware fast-path transactions read this global lock variable on the start and verify that it is free (lines 3-4). Since this variable is cached and we expect execution of the slow-slow mode to be rare, the cost or reading this lock variable is negligible. The fast-path hardware transactions abort upon a first fallback to the slow-slow commit, and wait for it to finish. In addition, the mixed-path reads inspect the global lock immediately after the read of the location, and if the lock is acquired, then spin-loop on it until it is free (lines 11-12). Also, we disallow concurrent slow-path commits while there is slow-slow mode commit by making the slow-path commit small hardware transaction verify that the global lock is not taken (lines 21-22).

4.1.2 Algorithm Optimization for HTM with Non-Speculative Operations

The new IBM Power 8 ISA transactional memory specification defines a hardware transactional memory system with a suspend-resume operation. They allow suspending a hardware transaction, so that a non-transactional code can execute, and then resuming the transaction execution. An RH NORec algorithm based on this feature can have an improved slow-path commit implementation that completely eliminates the potential global clock abort window.

RH NORec slow-path commit performs the following steps: (1) samples the global clock, (2) revalidates the read-set, (3) executes a small hardware transaction that writes the write-set locations atomically, and (4) revalidates that the current global clock is equal to the one it has read before (in step 1). As a result, the slow-path commit will restart itself, if the global clock changes between steps (1) and (4). We can reduce this abort window if the hardware allows non-speculative (non-transactional) memory operations inside a hardware transaction.

The main idea behind the new slow-path commit is to use the hardware speculation as a protection for the write locations. The new slow-path commit starts by executing a small hardware transaction that writes to every write location its current value and then suspends itself. This puts the write locations into hardware monitoring, and now it performs the read-set value-based revalidation outside of the hardware transaction. Upon revalidation success, it resumes the small hardware transaction, writes the new values to the write locations, and commits it. If the hardware fails to commit, it restarts the slow-path commit procedure. The whole slow-path transaction is restarted only when there is a real conflict (revalidation failure) or a real hardware limitation (capacity problem).

The new slow-path commit is correct because any concurrent read or write of any of the monitored write locations will disallow the small hardware transaction from committing successfully. The behavior is similar to locking the write locations, with the difference that if someone touches a write location then it proceeds and aborts the committing transaction. As a result, there is no need for global clock reads and checks during the commit procedure, and the only requirement is to increment the global clock on the commit finish.

FIG. 25 shows the new slow-path commit implementation. The fast-path and the rest of the functions remain the same for this version of RH NORec.

4.2 RH NORec Performance Evaluation

We evaluated the performance of our new RH NORec algorithm on an 8-way Intel Haswell chip with 4 cores, each multiplexing 2 hardware threads (HyperThreading). For our testing we used a red-black tree benchmark. The algorithms we benchmarked were:

HTM—Hardware TM: Transactions execute as pure hardware transactions using the Intel Haswell RTM mechanism, and on failure restart as pure hardware transactions. This indicates the best performance that can be achieved by the HTM mechanism.

Standard HyTM—The Standard Hybrid Transactional Memory: A state-of-the-art hybrid TL2-Style TMs. The software slow-path executes a TL2 STM and the hardware fast-path reads and writes inspect the per location metadata (using a single "if" condition check).

TL2—A TL2 STM implementation that uses a GV6 global clock.

HY-NORec—Original Hybrid NORec: The hardware fast-path reads the global clock on start and increments it on commit. The software slow-path executes the NORec STM. There are two variants: HY-NORec-10 and HY-NORec-100. The first executes 10% of the fast-path aborted transactions in the mixed slow-path and the remaining 90% retry the fast-path, while the second executes 100% of the aborts in the slow-path.

RH-NORec—Reduced Hardware NORec: This is our new hybrid TM. The hardware fast-path only updates the global clock at the end of the transaction during the hardware commit, the mixed software slow-path executes the transaction body in pure software, and the transaction commit writes by using a small hardware transaction. In a similar way to HY-NORec, there are two variants: RH-NORec-10 and RH-NORec-100. The first executes 10% of the fast-path aborts in the mixed slow-path and the remaining 90% of transactions retry in the fast-path; the second executes 100% of the aborts in the slow-path.

The red-black tree implementation exposes a key-value pair interface of put, delete, and get operations. If the key is not present in the data structure, put will put a new element describing the key-value pair. If the key is already present in the data structure, put will simply insert the value associated with the existing key. The get operation queries the value for a given key, returning an indication if the key was present in the data structure. Finally, delete removes a key from the data structure, returning an indication if the key was found to be present in the data structure.

The benchmark allows us to control the tree size and the fraction of write transactions executed, called mutation ratio. We execute every run for 10 seconds, and report the average number of operations completed per second.

Figure 26:
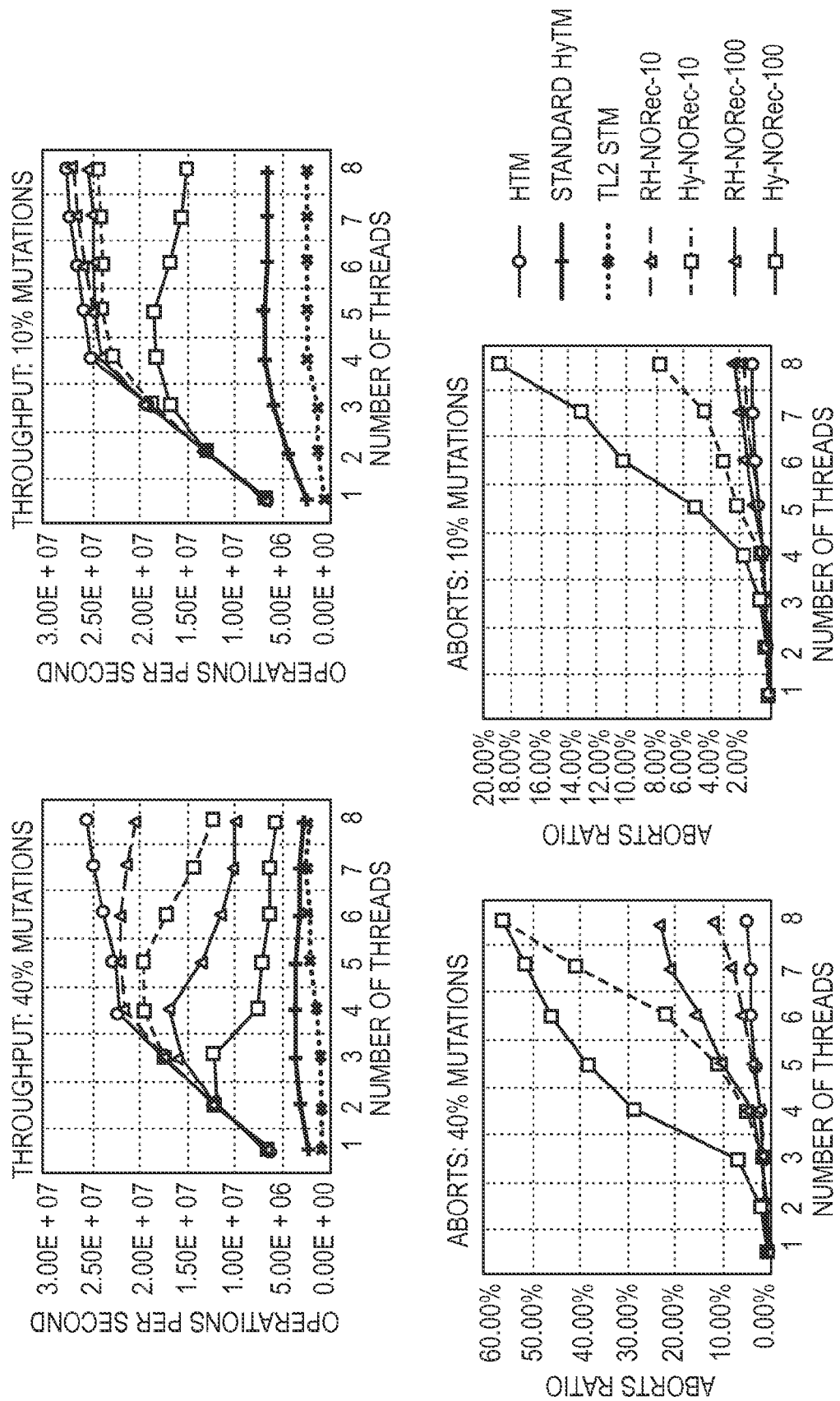
FIG. 26 is graphs showing results of a red-black tree emulation for various transactional memory algorithms.

FIG. 26 shows the results for a red-black tree with 1K nodes and 40% and 10% rates of mutation respectively. We performed the same benchmarking for larger trees, with 5K-10K nodes, and saw similar results. Increasing the tree size beyond 10K nodes makes the hardware fast-path abort too often, so that most of the time slow-paths execute, and the advantage of using an HTM is lost. The upper graphs show the throughput for 40% and 10% mutations in the tree, and the bottom graphs show the corresponding abort rates. We can see a clear performance advantage of RH-NORec over HY-NORec, and from the lower graphs it is clear that this is completely correlated with the higher rate of HY-NORec aborts due to reading the global clock into the HTM transactional at the start of each transaction. Further, RH-NORec delivers performance that is very close to that of pure HTM.

Looking at FIG. 26, we note that pure hardware transactions executed using the Intel RTM hardware transactional mechanism have a performance deterioration after 4 threads. The reason for this is the HyperThreading mechanism that multiplexes additional new threads, so 2 threads run on every core, from 5 to 8 threads. This makes every 2 threads on the same core share an L1 cache, on which they conflict often.

Looking at the results of our benchmark, we can see that there is a big advantage of HTM over the TL2 STM, and that the Standard HyTM algorithms eliminate almost all of this advantage due to their need to inspect metadata on each read or write. Standard HyTM performance is close to that of the TL2 STM and is very far from the HTM's potential. The HY-NORec and the RH-NORec algorithms eliminate the Standard HyTM instrumentation from the fast-path hardware transactions, and accordingly achieve a better performance.

In the 40% mutation benchmark (upper left graph of FIG. 26) we have two types of executions for the RH-NORec and HY-NORec. One that forwards 10% of the hardware fast-path aborts to the mixed slow-path and the remaining 90% retry again in the fast-path, and another that forwards all of the 100% of the aborts to the slow-path. This percentage is indicated by the line name. We can see that RH-NORec-10 outperforms HY-NORec-10 by a factor of 1.7, and RH-NORec-100 outperforms HY-NORec-100 by a factor of 2.4. Overall, RH-NORec is able to get very close to the HTM's performance, and we can see this with RH-NORec-10.

The performance difference is perhaps mostly explained by the difference in the algorithms' abort rates. Analysis of the abort ratios for the 40% mutation case (bottom left graph of FIG. 26) shows us that there is a significant difference in the aborts between the RH-NORec and HY-NORec. The lines correspond to the algorithms in the upper left graph of throughput. For the 10% slow-paths case, HY-NORec suffers a 5 times higher abort rate compared to the RH-NORec, and for the 100% slow-path its abort rate is still 2 times higher. The main reason for this is the fact that HY-NORec reads the global clock on the hardware fast-path start. As a result, a HY-NORec slow-path update of the global clock triggers an abort of all current hardware transactions, which introduces unnecessary aborts. In contrast, the RH-NORec fast-paths access the global clock only at the commit point, and therefore avoid all of these aborts.

In the 10% mutation benchmark (upper right graph of FIG. 26), we can see that there is almost no difference between RH-NORec-10 and RH-NORec-100. Both of them exhibit a very low abort ratio. But, there is a difference for HY-NORec-10 and HY-NORec-100, where HY-NORec-10 is able to get close to RH-NORec performance. This is due to the sensitivity of the HY-NORec to slow-path aborts that may result in a system-wide abort of all hardware transactions. The HY-NORec-10 exhibits 7% aborts in total (look at the bottom right part of the graph), while the HY-NORec-100 exhibits as high as 19% aborts; this makes a big difference in the performance.

Analysis of the aborts for the 10% mutation case shows the same behavior as for the 40% mutation. RH-NORec incurs approximately 2% aborts in general, and HY-NORec incurs 7% and 19%, which is a 3-10 times difference. As before, we can see a correlation between the aborts and the resulting throughput.

5 Variations and Extensions

The techniques described herein are example implementations of the general approach presented. This approach can be summarized as: develop a hybrid transactional memory in which the slow path, previously based on software using single location synchronization operations in hardware, is now supplemented by executing part of the operations using a multi-location hardware transaction. This new hardware addition to the slow-path can be for various reasons. The main one is to speed up the all-hardware fast-paths as in described algorithms. We note that in the implementations we use one hardware transaction along the slow-path. There is however no reason not to have more than one such hardware transaction in the otherwise software slow-path. Also, note that we have a slow-path that combines hardware and software, and it has a slow-slow-path that is all software. One could for example have more than 3 such levels, and many of these levels could have hardware sections. For example, one could envision a system that has an all hardware fast-path, a slow-path in the style of RH2, which defaults to a slow-path of the style RH1, which defaults to an all software slow path. In such a construction from one level to the next the length of the part of the transaction executed in hardware becomes shorter and its chances of success, and hence the overall system progress, increase.

In one implementation, one can use our HyTM to extend the length of possible hardware transaction executions. In other words, one starts a hardware transaction, commits it, and then continues with a software transaction, so that the combination of the two is the same as one atomic transaction. Start with the hybrid TM hardware transaction that tracks the read-set and the write-set, and before its commit, re-stores the write locations to their old values, and stores the new values to a software write-set. After a hardware transaction successful commit, the execution continues with the hybrid TM software transaction that uses the hardware transaction's write-set as a starting write-set. On commit, all is the same except the fact that the software transaction revalidates the combined read-set of the hardware and software transactions. As a result, the hardware transaction plus the software transaction execute as one atomic transaction.

In another implementation, using slight modifications one can continue the hardware transaction with a similar hardware transaction. Consider the following scenario: start with a hardware transaction that tracks the read-set and the write-set, and on commit, restores the write locations old values, and puts the new values into the software write-set buffer. When starting the next hardware transaction, the software write-set is written to the memory (speculatively) and it executes in the same way. Upon commit, it generates the next software write-set, and the execution can continue to the next hardware transaction and so on. Upon final commit, one has a final software write-set, which is written to the memory atomically. The scenario described above does not provide a correct solution, because transactions can write on one another's read-sets. Therefore, we implement the hardware transactions with "visible reads", so that concurrent atomic write-back can verify that the locations it writes are not currently read by concurrent transactions. For this, a read mask array is associated with every read location, so that mask's K-th component (bit or byte or word) is associated with thread K, and it is updated by this thread when reading. In this way, a thread K notifies others that it is reading this location.

6 Exemplary Hardware Implementations

The techniques described herein can be implemented in digital electronic circuitry, or in computer hardware, firmware, software, or in combinations of them. The techniques can be implemented as a computer program product, i.e., a computer program tangibly embodied in non-transitory medium such as a machine-readable storage device, or to control the operation of a data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer, mobile device, smartphone, tablet, and the like, having a display device, e.g., a CRT (cathode ray tube) or LCD (liquid crystal display) monitor, for displaying information to the user and an input device, e.g., a keyboard, touchscreen, touchpad, mouse or trackball, by which the user can provide input to the computer or other device (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It should also be noted that implementations of the present invention can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Certain implementations of the present invention are described above. It is, however, expressly noted that the present invention is not limited to those implementations, but rather the intention is that additions and modifications to what is expressly described herein are also included within the scope of the invention. Moreover, it is to be understood that the features of the various implementations described herein are not mutually exclusive and can exist in various combinations and permutations, even if such combinations or permutations are not made express herein, without departing from the spirit and scope of the invention. In fact, variations, modifications, and other implementations of what is described herein will occur to those of ordinary skill in the art without departing from the spirit and the scope of the invention. As such, the invention is not to be defined only by the preceding illustrative description, but rather by the claims.

What is claimed is:

1. A system, comprising:
   at least one processor; and
   at least one memory storing computer-executable instructions that, when executed by the at least one processor, configure the system to:
   receive a transaction to be executed;
   initially attempt to execute the transaction in a hardware path; and
   upon a failure to successfully execute the transaction in the hardware path, attempt to execute the transaction in a hardware-software path, wherein the hardware-software path comprises a software path and at least one hardware transaction, wherein attempting to execute the transaction in the hardware-software path comprises performing writes from the software path in the at least one hardware transaction, wherein the transaction is executed without instrumenting reads in the hardware path, and
   wherein the hardware-software path is configured to execute hardware transactions and software transactions concurrently.

2. The system of claim 1, further comprising a shared memory space partitioned into a plurality of logical stripes, each stripe comprising an associated metadata entry.

3. The system of claim 2, wherein transactions executed by the system communicate with each other using the metadata entries.

4. The system of claim 2, wherein reads of the shared memory space executed in the hardware path do not require inspection of the metadata entries.

5. The system of claim 2, wherein writes to the shared memory space executed in the hardware path do not require conditional branching based on the metadata entries.

6. The system of claim 1, wherein the hardware transaction is atomic.

7. The system of claim 1, wherein, in executing the transaction in the hardware-software path, the system is configured to:
   execute a software transactional memory transaction in the software path while postponing writes until a commit phase; and
   in the commit phase, perform the writes in the hardware transaction.

8. The system of claim 7, wherein, in executing the transaction in the hardware-software path, the system is further configured to perform a commit validation in the commit phase.

9. The system of claim 1, wherein execution of the instructions further configures the system to, upon a failure to successfully execute the hardware transaction, attempt to re-execute the hardware transaction.

10. The system of claim 9, wherein execution of the instructions further configures the system to, upon exceeding a threshold number of failures to successfully execute the hardware transaction, execute the transaction in a full software path.

11. The system of claim 1, wherein the at least one hardware transaction comprises a single hardware transaction.

12. The system of claim 1, wherein the at least one hardware transaction comprises a plurality of hardware transactions.

13. The system of claim 1, wherein the at least one hardware transaction comprises fewer operations than a number of operations in the hardware path.

14. In a system comprising at least one memory storing computer-executable instructions, a method comprising:
   executing the instructions by at least one processor, the execution of the instructions resulting in operations that comprise:
   receiving a transaction to be executed;
   initially attempting to execute the transaction in a hardware path; and
   upon a failure to successfully execute the transaction in the hardware path, attempting to execute the transaction in a hardware-software path, wherein the hardware-software path comprises a software path and at least one hardware transaction, wherein attempting to execute the transaction in the hardware-software path comprises performing writes from the software path in the at least one hardware transaction, wherein the transaction is executed without instrumenting reads in the hardware path, and wherein the hardware-software path is configured to execute hardware transactions and software transactions concurrently.

15. The method of claim 14, further comprising accessing a shared memory space partitioned into a plurality of logical stripes, each stripe comprising an associated metadata entry.

16. The method of claim 15, wherein executed transactions communicate with each other using the metadata entries.

17. The method of claim 15, wherein reads of the shared memory space executed in the hardware path do not require inspection of the metadata entries.

18. The method of claim 15, wherein writes to the shared memory space executed in the hardware path do not require conditional branching based on the metadata entries.

19. The method of claim 14, wherein the hardware transaction is atomic.

20. The method of claim 14, wherein executing the transaction in the hardware-software path comprises:

executing a software transactional memory transaction in the software path while postponing writes until a commit phase; and in the commit phase, performing the writes in the hardware transaction.

21. The method of claim 20, wherein executing the transaction in the hardware-software path further comprises performing a commit validation in the commit phase.

22. The method of claim 14, further comprising, upon a failure to successfully execute the hardware transaction, attempting to re-execute the hardware transaction.

23. The method of claim 22, further comprising, upon exceeding a threshold number of failures to successfully execute the hardware transaction, executing the transaction in a full software path.

24. The method of claim 14, wherein the at least one hardware transaction comprises a single hardware transaction.

25. The method of claim 14, wherein the at least one hardware transaction comprises a plurality of hardware transactions.

26. The method of claim 14, wherein the at least one hardware transaction comprises fewer operations than a number of operations in the hardware path.

* * * * *